United States Patent
Boecker et al.

(10) Patent No.: US 11,682,915 B2
(45) Date of Patent: Jun. 20, 2023

(54) CHARGE COUPLER AND METHOD FOR AUTONOMOUSLY CHARGING VEHICLE BATTERIES

(71) Applicant: Zoox, Inc., Foster City, CA (US)

(72) Inventors: Moritz Boecker, Millbrae, CA (US); Bryan Emrys Booth, San Francisco, CA (US); Timothy David Kentley-Klay, Stanford, CA (US); Richard Luke Osellame, Redwood City, CA (US); Christopher John Stoffel, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/486,298

(22) Filed: Sep. 27, 2021

(65) Prior Publication Data

US 2022/0016989 A1    Jan. 20, 2022

Related U.S. Application Data

(63) Continuation of application No. 16/214,826, filed on Dec. 10, 2018, now Pat. No. 11,130,412.

(51) Int. Cl.
*H02J 7/00* (2006.01)
*B60L 58/10* (2019.01)
(Continued)

(52) U.S. Cl.
CPC ............ *H02J 7/0042* (2013.01); *B60L 53/16* (2019.02); *B60L 58/10* (2019.02); *H01R 13/453* (2013.01); *H02J 7/0013* (2013.01)

(58) Field of Classification Search
CPC ...... H02J 7/0013; H02J 7/0027; H02J 7/0029; H02J 7/0042; B60L 53/16; B60L 53/10; B60L 58/10; H01R 13/453
(Continued)

(56) References Cited

U.S. PATENT DOCUMENTS 5,478,249 A    12/1995    Crestin
6,783,199 B2    8/2004    Parrott
(Continued)

FOREIGN PATENT DOCUMENTS

CN    107302153    10/2017
CN    107719173    2/2018

OTHER PUBLICATIONS

Office action for U.S. Appl. No. 16/214,826, dated Jan. 7, 2021, Boecker, "Charge Coupler and Method for Autonomously Charging Vehicle Batteries", 8 pages.
(Continued)

*Primary Examiner* — Phallaka Kik
(74) *Attorney, Agent, or Firm* — Lee & Hayes, P.C.

(57) ABSTRACT

A system for charging a battery carried by a vehicle may include a charging box for coupling to a vehicle chassis and including interface electrical contacts electrically coupled to the battery. The system may also include a charge coupler including coupler electrical contacts for electrically coupling to the interface electrical contacts from under the vehicle and configured to be coupled to an electrical power supply. The charging box may include an interface activation surface, and the charge coupler may include a housing for enclosing the coupler electrical contacts and including a base for supporting the coupler electrical contacts, a coupler activation surface opposite the base, an opening, and a door configured to open the opening to expose the coupler electrical contacts as the interface activation surface contacts the coupler activation surface and moves the coupler activation surface toward the base.

20 Claims, 11 Drawing Sheets

(51) Int. Cl.
*B60L 53/16* (2019.01)
*H01R 13/453* (2006.01)

(58) Field of Classification Search
USPC .......................................... 320/109, 104, 108
See application file for complete search history.

(56) References Cited

U.S. PATENT DOCUMENTS

| | | | |
|---|---|---|---|
| 10,661,669 B1 | 5/2020 | Torok et al. | |
| 10,682,921 B2* | 6/2020 | Booth | ................... B60L 53/12 |
| 11,034,254 B2* | 6/2021 | Booth | ................... B60L 53/35 |
| 11,541,765 B2* | 1/2023 | Booth | ................... B60L 53/66 |
| 2002/0124906 A1 | 9/2002 | Suzuki et al. | |
| 2006/0053631 A1 | 3/2006 | Fossella | |
| 2014/0043740 A1 | 2/2014 | Richardson et al. | |
| 2015/0270734 A1 | 9/2015 | Davison et al. | |
| 2019/0073072 A1 | 3/2019 | Van Der Werff et al. | |
| 2019/0176633 A1* | 6/2019 | Booth | ................... B60L 53/14 |
| 2019/0176637 A1* | 6/2019 | Booth | ................... H02J 7/0014 |
| 2020/0180448 A1 | 6/2020 | Boecker et al. | |

OTHER PUBLICATIONS

The PCT Search Report and Written Opinion dated Feb. 10, 2020 for PCT Application No. PCT/US2019/064611, 13 pages.

* cited by examiner

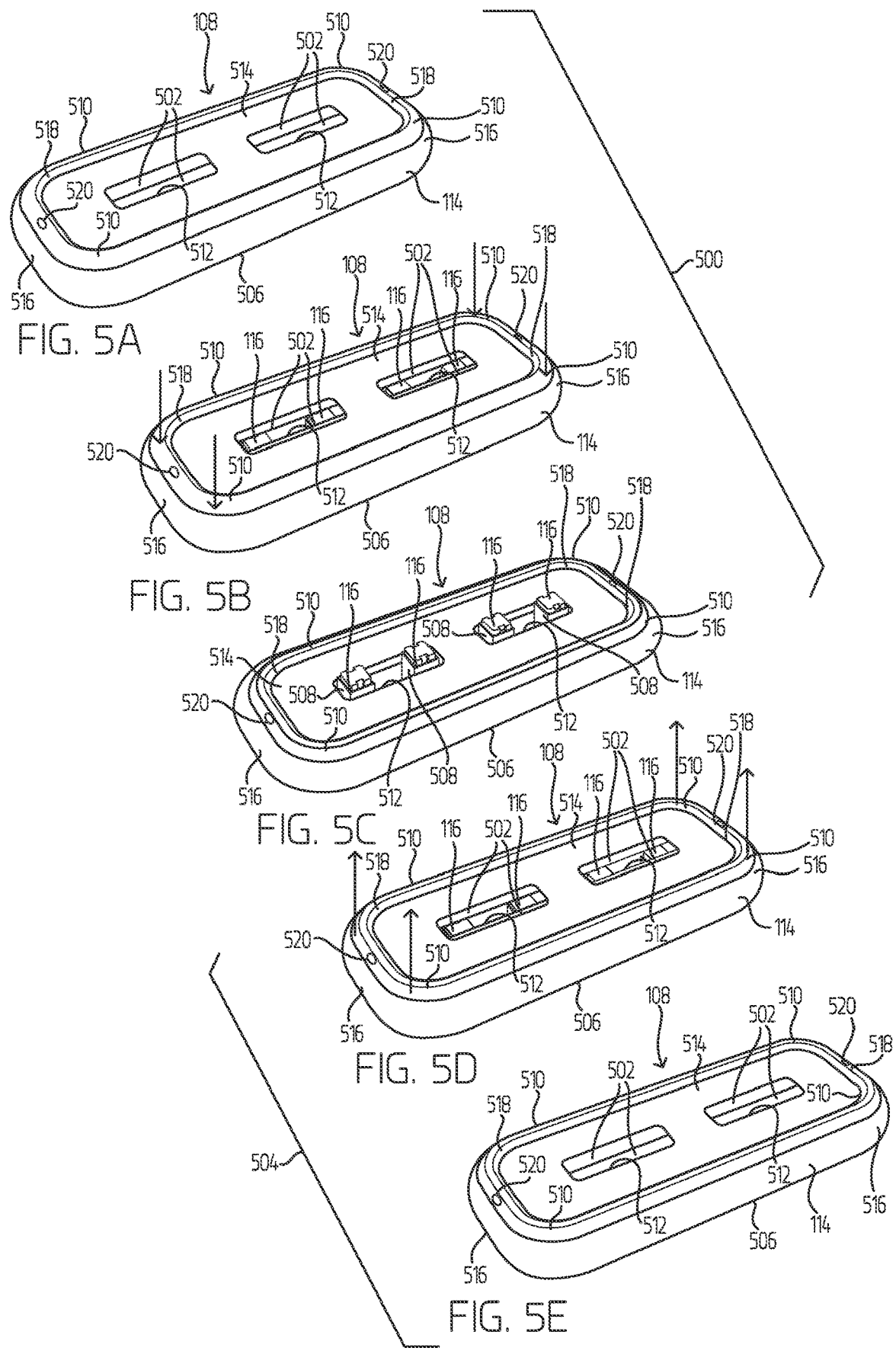

__US 11,682,915 B2__

1

CHARGE COUPLER AND METHOD FOR AUTONOMOUSLY CHARGING VEHICLE BATTERIES

RELATED APPLICATIONS

This application is a continuation of and claims priority to U.S. patent application Ser. No. 16/214,826, filed Dec. 10, 2018, now U.S. Pat. No. 11,130,412, titled, "CHARGE COUPLER AND METHOD FOR AUTONOMOUSLY CHARGING VEHICLE BATTERIES," the entirety of which is incorporated herein.

BACKGROUND

Electric vehicles often rely on rechargeable batteries to supply electrical power to various components, such as electric motors. Recharging the battery may present a number of technical considerations. For example, the convenience, the duration, and the safety associated with the charging process may be important factors. For example, due to the relatively limited range of some electric vehicles, providing recharging devices at numerous and convenient locations may be a consideration. In addition, reducing the time necessary for recharging the battery may be important for some uses of electric vehicles.

In some conventional charging devices where electrical connectors having pin-type connectors are used, the connectors may be insufficiently durable for frequent use. This may result in such electrical connectors being unsuitable for uses that might include thousands of connections and disconnections, such as, for example, a fleet of electric vehicles that operate in a substantially constant manner, requiring frequent charging cycles.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

FIG. 5A is a perspective view of a first instance during an example sequence opening an example charge coupler housing.

FIG. 5B is a perspective view of a second instance during the sequence opening the charge coupler housing.

FIG. 5C is a perspective view of a third instance during the sequence opening the charge coupler housing.

FIG. 5D is a perspective view of a first instance during an example sequence closing the charge coupler housing.

FIG. 5E is a perspective view of a second instance during the sequence closing the charge coupler housing.

2

Figure 6A:
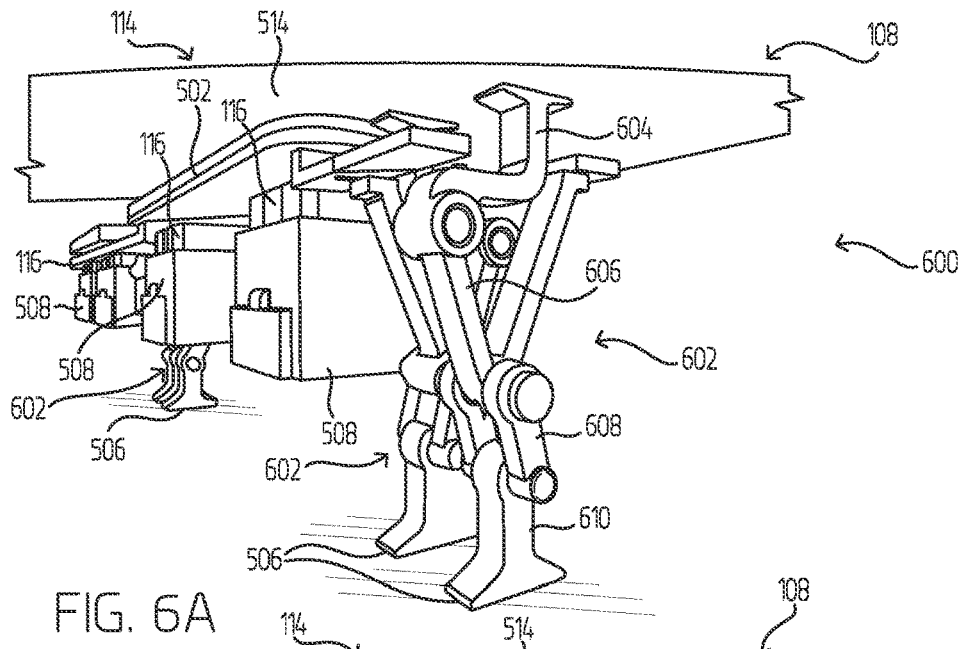
FIG. 6A is a perspective view of a first instance of an interior of an example charge coupler housing during an example sequence opening the charge coupler housing.
Figure 6B:
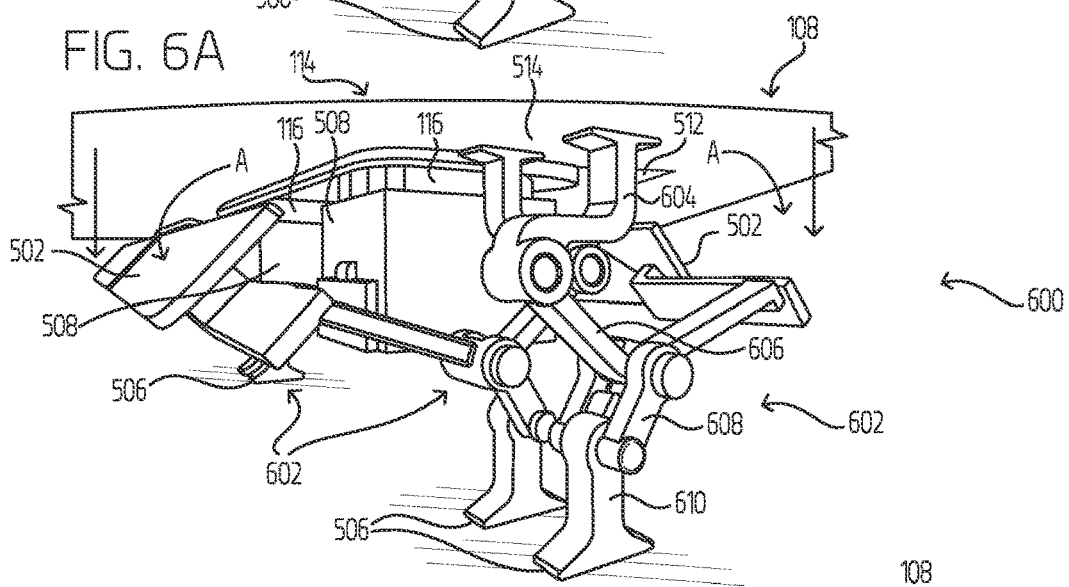

FIG. 6B is a perspective view of a second instance of the interior of the charge coupler housing during the sequence opening the charge coupler housing.

Figure 6C:
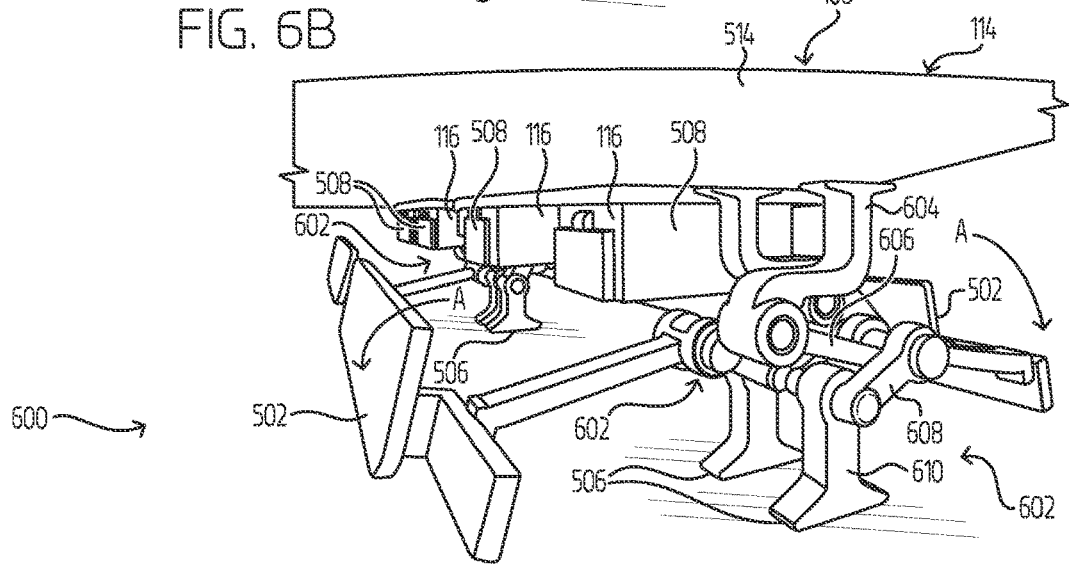

FIG. 6C is a perspective view of a third instance of the interior of the charge coupler housing during the sequence opening the charge coupler housing.

Figure 7:
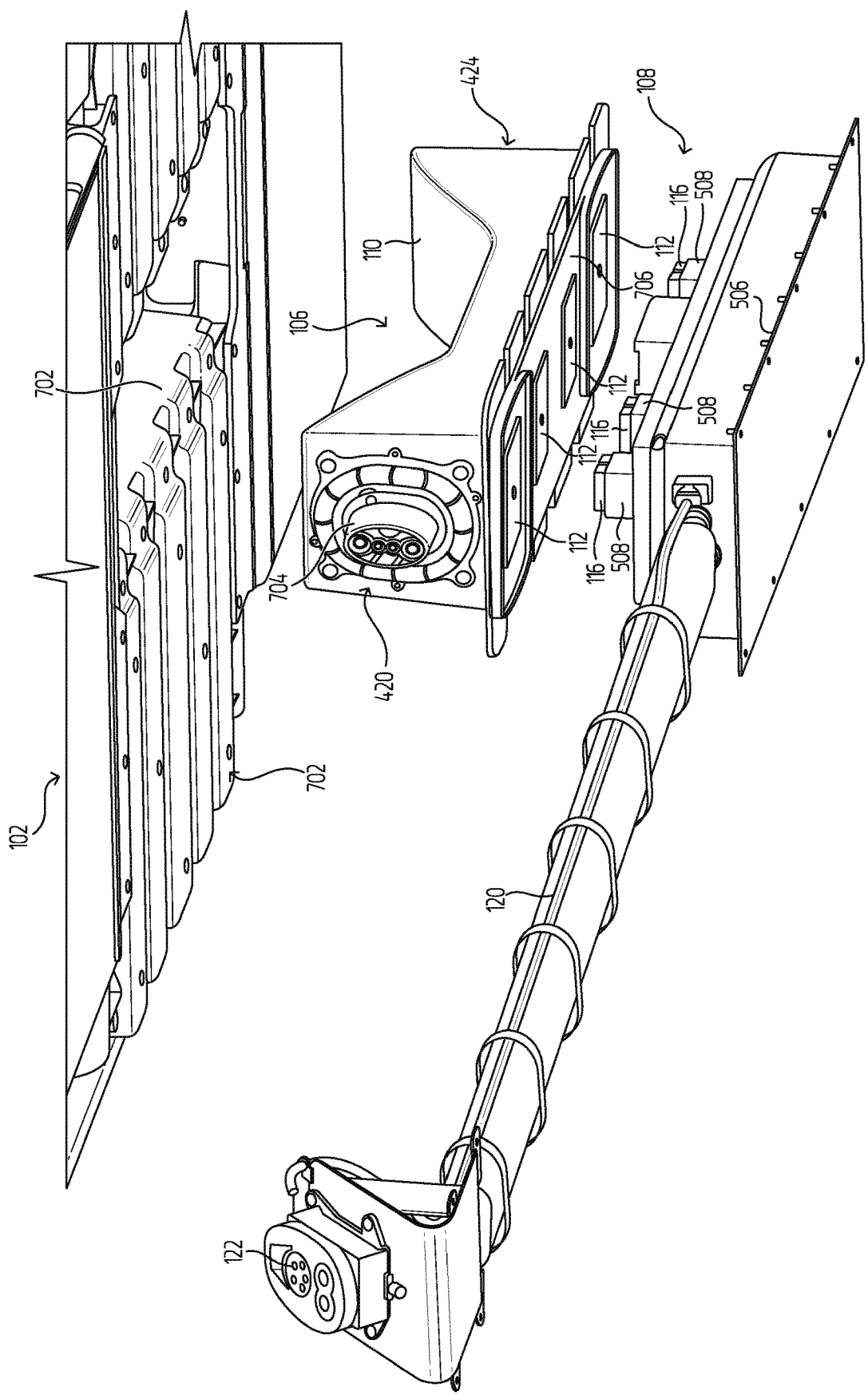

FIG. 7 is a perspective view of an example charge coupler, an example charging box, and an underside of an example vehicle.

Figure 8:
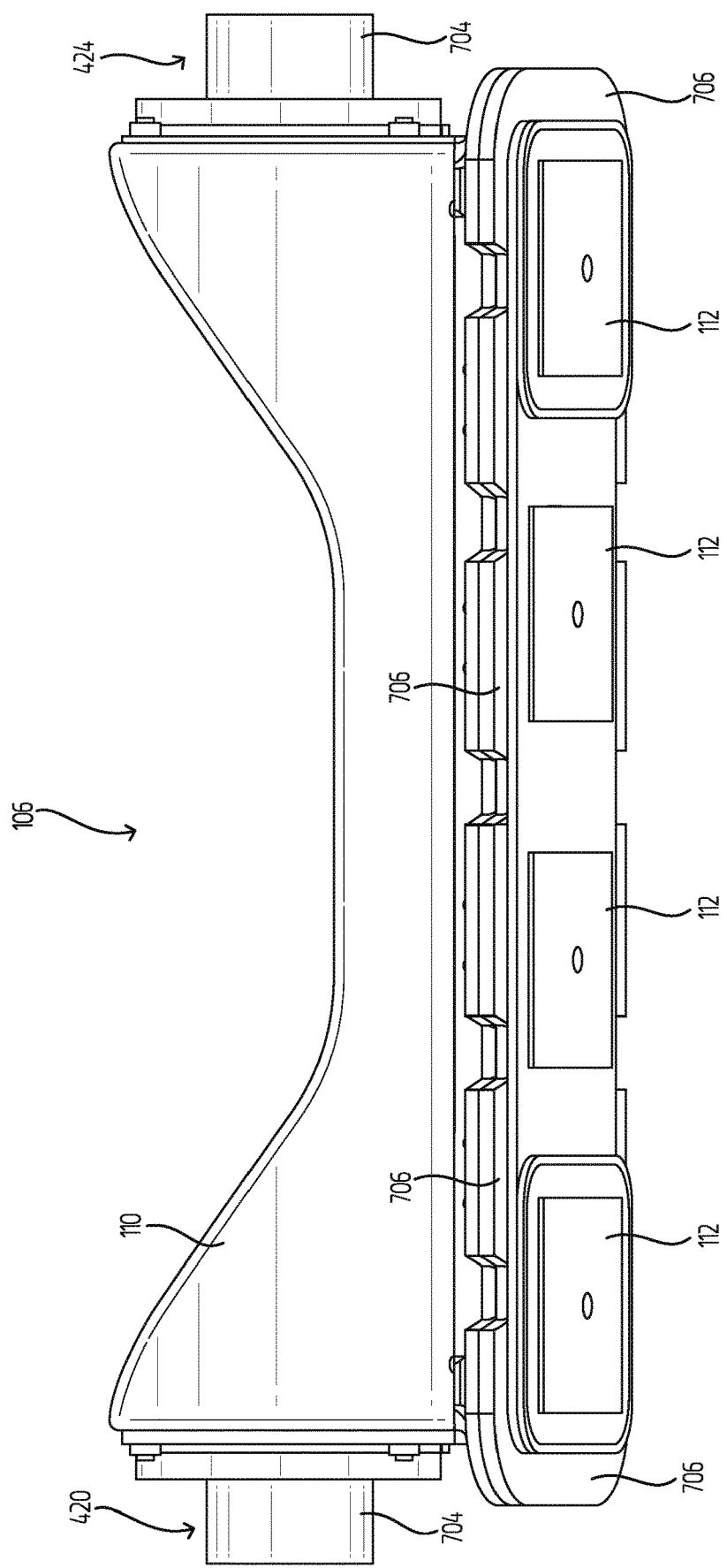

FIG. 8 is a perspective view of an example charging box.

Figure 9:
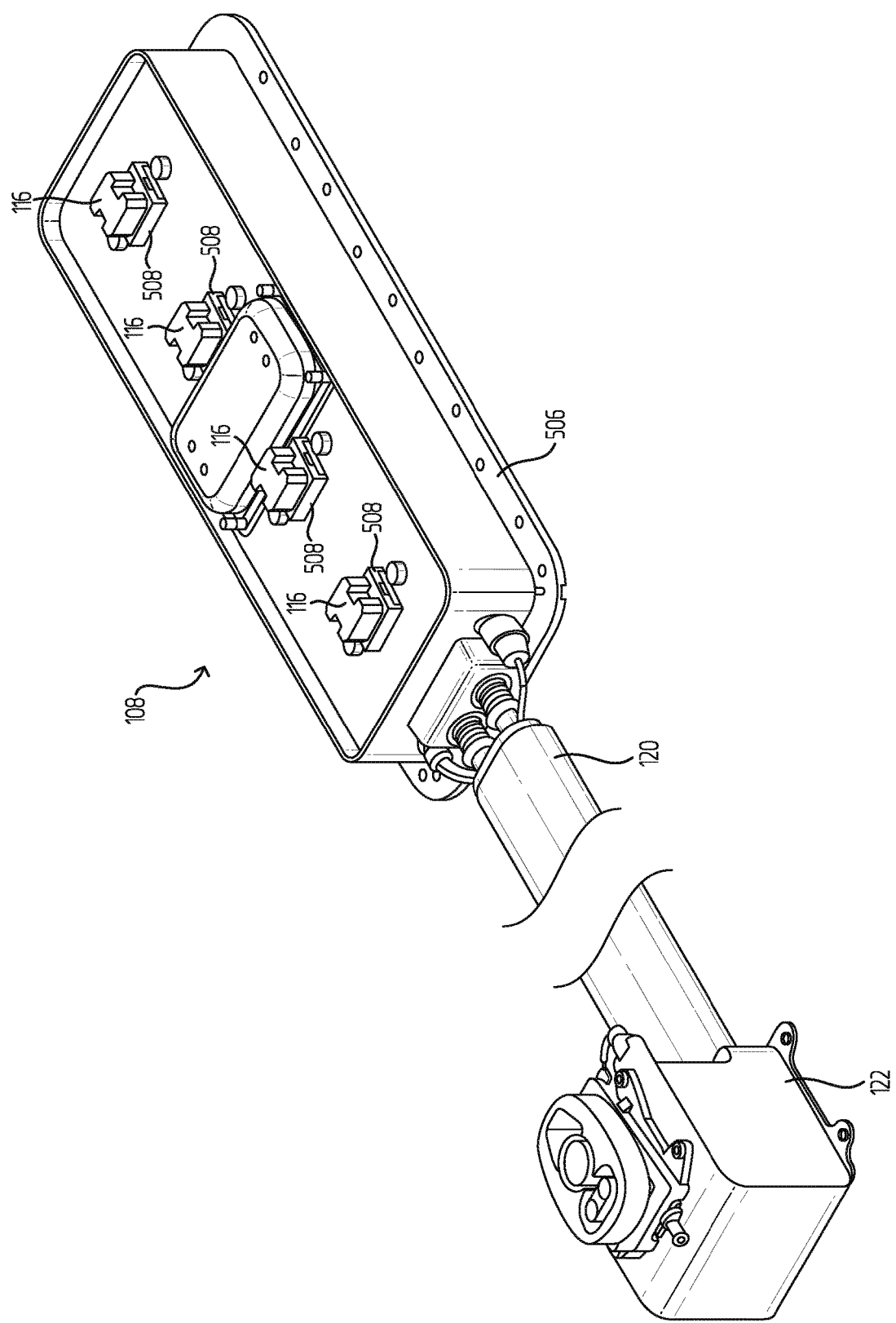

FIG. 9 is a perspective view of an example charge coupler.

Figure 10A:
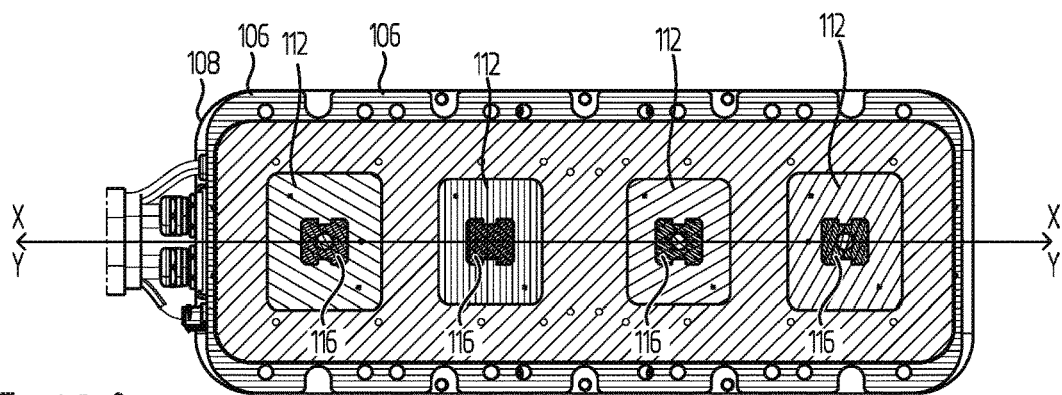

FIG. 10A is a section view showing an example alignment between example coupler electrical contacts and example interface electrical contacts.

Figure 10B:
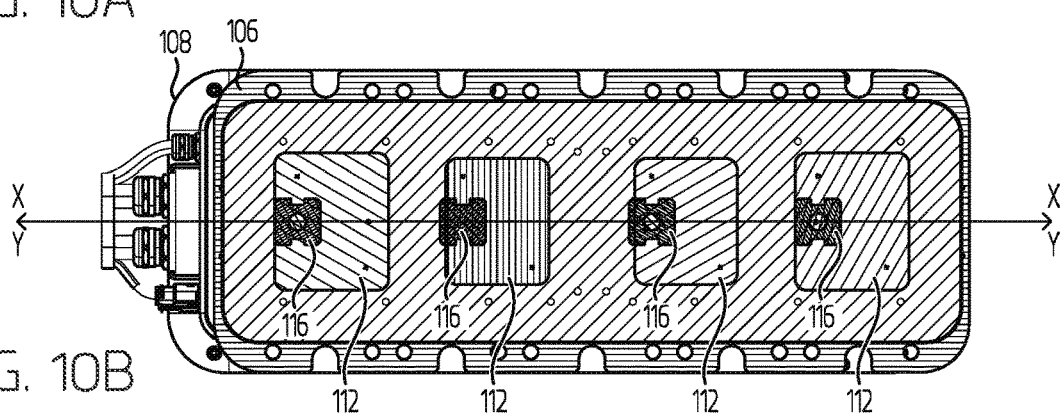

FIG. 10B is a section view showing an example offset between the coupler electrical contacts and the interface electrical contacts shown in FIG. 10A.

Figure 10C:
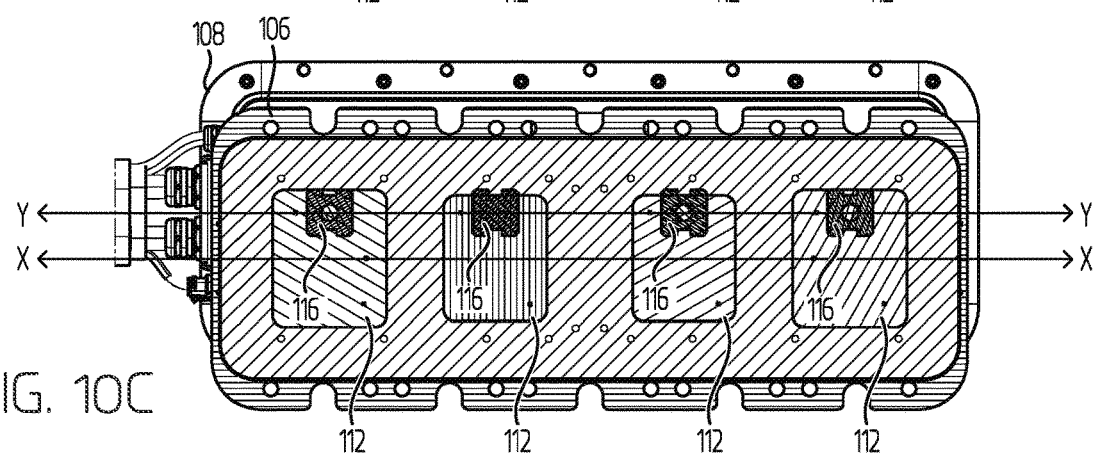

FIG. 10C is a section view showing another example offset between the coupler electrical contacts and the interface electrical contacts shown in FIG. 10A.

Figure 10D:
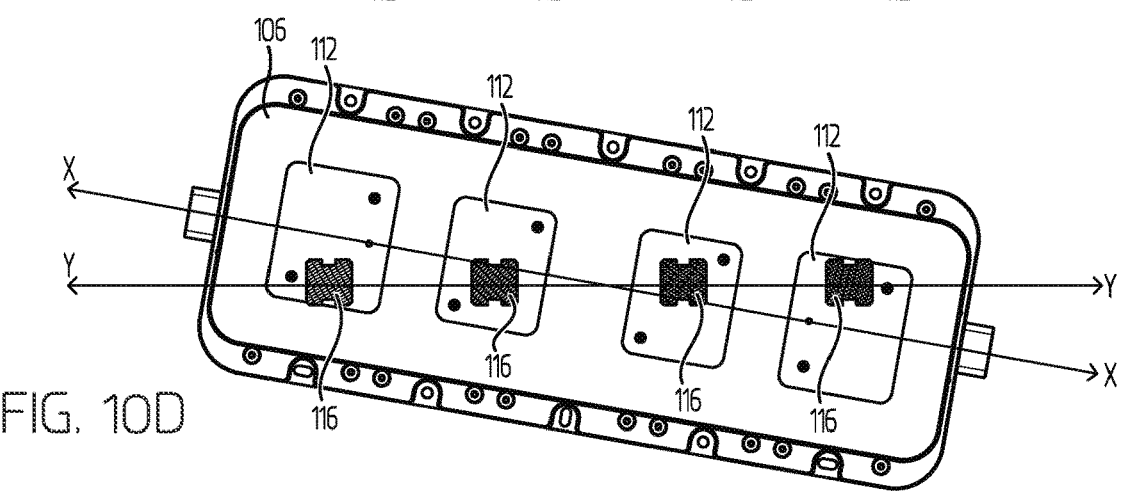

FIG. 10D is a view showing an example misalignment between the coupler electrical contacts and the interface electrical contacts shown in FIG. 10A.

Figure 11:
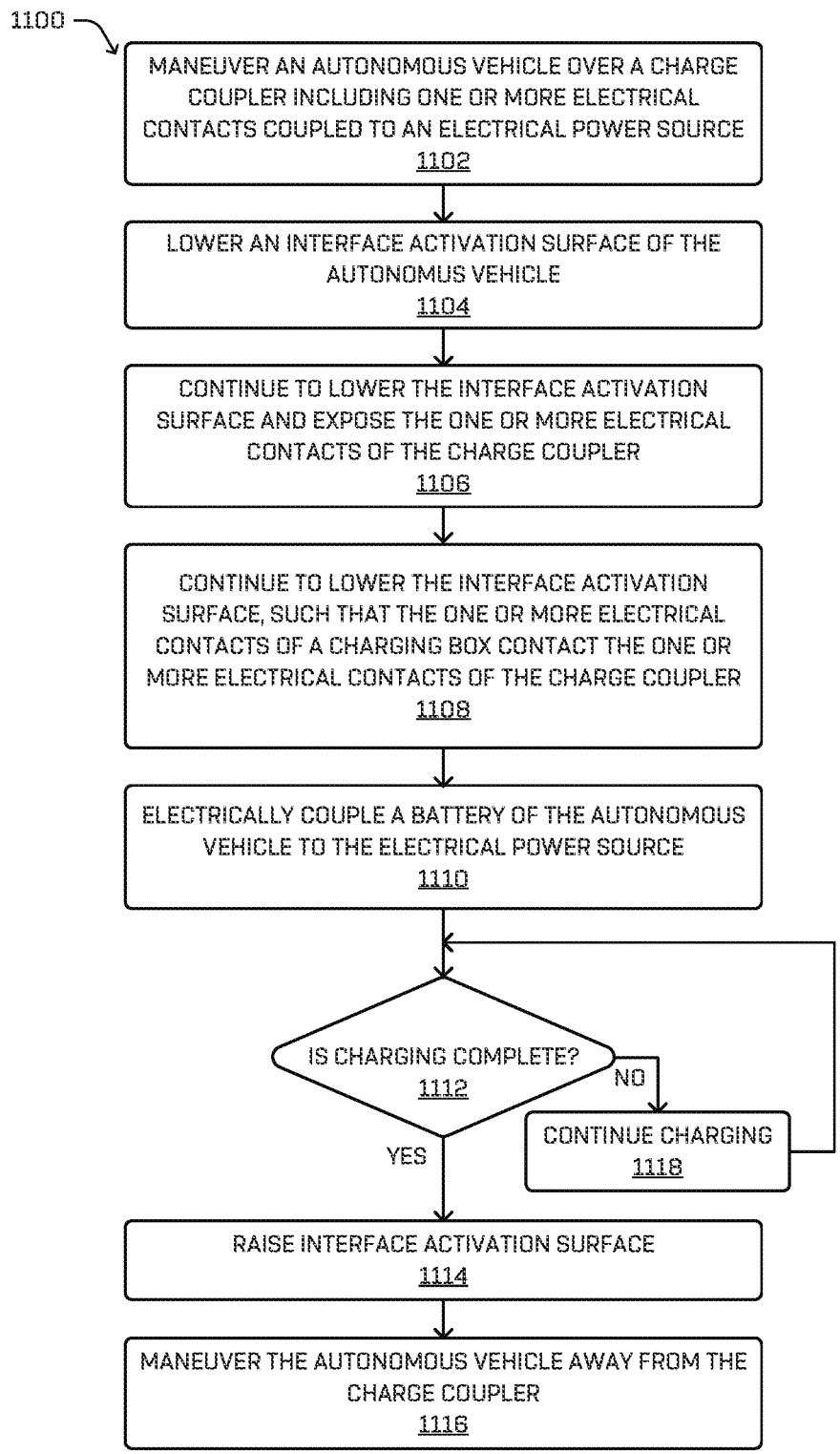

FIG. 11 is a flow diagram of an example process for autonomously charging one or more batteries of an autonomous vehicle.

DETAILED DESCRIPTION

As noted above, some conventional charging devices include a power cable having an electrical connector for connecting with a mating electrical connector coupled to an electric vehicle, so that electrical power may be supplied to the battery of the vehicle during charging. Some conventional electrical connectors are pin-type connectors that include pins configured to fit into corresponding recesses including electrical contacts for electrically connecting the power cable to the battery of the vehicle. Although pin-type electrical connectors may be sufficient for some uses, such as residential use, for systems expected to be used frequently and by different users, thereby resulting in frequent connections and disconnections, pin-type electrical connectors may be insufficiently durable for such uses. This may result in such electrical connectors being unsuitable for uses that might include thousands of connections and disconnections, such as, for example, a fleet of electric vehicles that operate in a substantially constant manner, requiring frequent charging cycles. In addition, the use of such connectors requires someone to connect and disconnect the connectors, which may increase costs associated with, for example, recharging batteries of a fleet of vehicles requiring battery recharging for continued operation, and additionally may present potential safety concerns for people who connect and disconnect the electrical power feed required for recharging the batteries.

This disclosure is generally directed to methods, apparatuses, and systems for charging one or more batteries of a vehicle having one or more electrical propulsion units. A system for charging one or more batteries may include a charging box mounted to the underside of the vehicle to facilitate connection to a charge coupler from under the vehicle, with the charge coupler being configured to provide an electrical connection between an electrical power source and the charging box. A vehicle including the charging box may maneuver to a position above the charge coupler, after which the charging box may be lowered, for example, by reducing the ride height of the vehicle, such that a surface of the charging box presses against an upper surface of the charge coupler, resulting in doors on the charge coupler opening as the vehicle ride height further reduces, exposing electrical contacts of the charge coupler, so that electrical contacts of the charging box and the charge coupler may be brought into contact with one another. Once in contact with one another, the charge coupler and/or the charging box may be configured to provide electrical communication between the electrical power source and the one or more batteries, so that the electrical power source may increase the state of charge of one or more of the batteries. Thereafter, the electrical contacts of the charging box and the electrical contacts of the charge coupler may be separated from one another, the doors on the charge coupler may automatically close as the ride height of the vehicle increases, and the vehicle may maneuver away from the position over the charge coupler. In this example manner, the one or more batteries of the vehicle may be recharged without a person manually connecting the electrical power source to the vehicle. As a result, the system does not necessarily need relatively complex electrical connectors, such as, for example, pin-type connectors, thus potentially rendering the system more durable and providing greater longevity of use. Furthermore, because a person is not required to manually connect the connectors, the connectors may be sized to be much larger, allowing much more current to flow with much lower heat created, for example, without creating safety concerns.

This disclosure is also generally directed to a system for charging a battery carried by a vehicle. The vehicle may include a chassis and a battery coupled to the chassis. The vehicle may also include a charging box coupled to the chassis, and the charging box may include one or more interface electrical contacts in electrical communication with the battery and configured to be electrically coupled to an electrical power source. The charging box may also include an interface activation surface. The system may also include a charge coupler including an electrical connector configured to be coupled to the electrical power source, and one or more coupler electrical contacts configured to be electrically coupled to one or more interface electrical contacts of the vehicle from under the vehicle. The charge coupler may also include a housing for enclosing the one or more coupler electrical contacts of the charge coupler, and the housing may include a base configured to support the one or more electrical contacts of the charge coupler, and a coupler activation surface opposite the base. The coupler activation surface of the charge coupler may be configured to be contacted by the interface activation surface, and the charge coupler may also include an opening associated with the coupler activation surface. The charge coupler may also include a door configured to move between a first position closing the opening and a second position opening the opening and exposing the one or more coupler electrical contacts. In some examples, the coupler activation surface and the door may be coupled to one another, such that as the interface activation surface contacts the coupler activation surface and moves the coupler activation surface from the extended position toward the base to the compressed position, the door moves from the first position to the second position.

In some examples, the vehicle may include an adjustable suspension system configured to lower the vehicle relative a support surface on which the vehicle is supported and raise the vehicle relative to the support surface. In some examples, lowering the vehicle relative to the support surface may cause contact between the interface activation surface and the coupler activation surface. For example, at least a portion of the weight of the vehicle may be supported by the charge coupler, and the weight of the vehicle may serve to open the door, thereby exposing the coupler electrical contacts of the charge coupler. In some such examples, the adjustable suspension may be used to raise the vehicle relative to the charge coupler and/or the support surface, and the door may close as the vehicle raises. Alternatively, or in addition, the charging box may be configured to be lowered toward the coupler activation surface without necessarily lowering the vehicle relative to the support surface. In some examples, the coupler activation surface may be configured to raise toward the interface activation surface.

In some examples, the vehicle may include two batteries spaced from one another, and the charging box may include two outputs, each at opposite ends of the charging box, and each of the outputs may be electrically coupled to one of the two batteries. In some examples, each of the batteries may be mounted at opposite ends of the vehicle. For example, the vehicle may include two propulsion units located at opposite ends of the vehicle, and each of the batteries may be coupled to respective propulsion units of the vehicle.

In some examples, the one or more coupler electrical contacts of the charge coupler may present substantially planar coupler contact surfaces, and the one or more interface electrical contacts of the charging box may present substantially planar interface contact surfaces configured to provide an electrical coupling between the one or more interface electrical contacts of the charging box and the one or more coupler electrical contacts of the charge coupler. In some examples, each of the interface contact surfaces may define an interface surface area, and each of the coupler contact surfaces may define a coupler surface area. In some examples, the interface surface area may be greater than the coupler surface area, for example, such that effective electrical contact may be achieved between the one or more coupler electrical contacts of the charge coupler and the one or more interface electrical contacts of the charging box, for example, even when the coupler contacts and the interface contacts are not substantially aligned with one another and/or are offset with respect to one another. This may provide a level of tolerance in positioning the charging box relative to the charge coupler, so that an effective electrical connection may be obtained without exact alignment. In some examples, the coupler contact surfaces and/or the interface contact surfaces may have a substantially rectangular shape (e.g., a substantially square shape), though any other shape is contemplated.

In some examples, the charge coupler may include a peripheral portion coupling the base and the coupler activation surface to one another, for example, such that the coupler activation surface is moveable relative to the base between the extended position and the compressed position. For example, the peripheral portion may include a flexible material forming a seal between the base and the coupler activation surface. In some examples, the peripheral portion may be configured to act as a biasing member configured to bias the coupler activation surface toward the extended position. For example, the peripheral portion may include a resilient material configured to bias the coupler activation surface toward the extended position. In some examples, the housing of the charge coupler may also include a barrier opposite the base and coupled to the coupler activation surface. The barrier, in some examples, may define the opening. In some examples, the charge coupler may include more than one opening and/or more than one door. In some examples, the coupler activation surface may extend at least partially around a periphery of the barrier, and the barrier may move with the coupler activation surface.

The charge coupler, in some examples, may include a linkage coupling the coupler activation surface to the door, such that as the coupler activation surface moves from the extended position toward the base to the compressed position, the door moves from the first position to the second position. In some examples, the linkage may include at least one of one or more links, one or more gears, one or more oscillators, one or more actuators, one or more springs, one or more crank mechanisms, one or more rocker mechanisms, or one or more slide mechanisms. In some examples, the linkage may be configured to pivot the door through an arc between the first position and the second position. In some examples, the linkage may be coupled to the base, the coupler activation surface, and/or the door. Some examples may also include a biasing member (e.g., a helical spring and/or torsion spring) coupled to the linkage and configured to bias the coupler activation surface toward the extended position.

In some examples, the charge coupler may be configured such that when the coupler activation surface is in the compressed position, the one or more coupler electrical contacts extend through the opening, such that respective ends of the coupler electrical contacts remote from the base extend beyond a plane in which the opening lies. In some examples, the coupler electrical contacts may each be mounted such that biasing members bias them toward a position extending toward the interface electrical contacts, for example, to increase the likelihood of an effective electrical connection between the coupler electrical contacts and the interface electrical contacts. In some examples, the one or more coupler electrical contacts may be mounted to the charge coupler such that the coupler electrical contacts may move relative to the base in a lateral manner and/or a longitudinal manner.

This disclosure is also generally directed to a method for charging a battery carried by a vehicle, for example, a method for autonomously charging a battery carried by an autonomous vehicle. In some examples, the vehicle may include a charging box including one or more interface electrical contacts in electrical communication with the battery and an interface activation surface facing a support surface on which the vehicle is supported. The method, in some examples, may include maneuvering the vehicle over a charge coupler including one or more coupler electrical contacts coupled to an electrical power source. The charge coupler may include a housing enclosing the one or more coupler electrical contacts of the charge coupler and a coupler activation surface configured to face an underside of the vehicle. For example, the vehicle may be an autonomous vehicle, and maneuvering the vehicle may include autonomously maneuvering the autonomous vehicle over the charge coupler. In some examples, the method may also include lowering the interface activation surface relative to the support surface, such that the interface activation surface contacts the coupler activation surface of the charge coupler. The method may also include continuing to lower the interface activation surface, such that the interface activation surface causes the coupler activation surface to move toward the support surface and expose the one or more coupler electrical contacts of the charge coupler to the underside of the vehicle. In some examples, the method may also include continuing to lower the interface activation surface, such that the one or more interface electrical contacts of the charging box contact the one or more coupler electrical contacts of the charge coupler. The method may also include electrically coupling the battery to the electrical power source via the one or more coupler electrical contacts of the charge coupler and the one or more interface electrical contacts of the charging box.

In some examples of the method, lowering the interface activation surface may include lowering the vehicle relative to the support surface, for example, using an adjustable suspension system coupled to a chassis of the vehicle. In some examples of the method, causing the coupler activation surface to move toward the support surface may cause a door coupled to the charge coupler to move from a first position closing an opening in the charge coupler to a second position opening the opening in the charge coupler, thereby exposing the one or more coupler electrical contacts of the charge coupler to the one or more interface electrical contact of the charging box.

The method, in some examples, may also include raising the interface activation surface relative to the support surface and closing the housing, so that the one or more coupler electrical contacts are no longer exposed. In some examples, the method may include raising the interface activation surface relative to the support surface, so that the interface activation surface and the coupler activation surface are separated from one another, and maneuvering the vehicle away from the charge coupler. In some examples, the vehicle may be an autonomous vehicle, and maneuvering the vehicle away from the charge coupler may include autonomously maneuvering the autonomous vehicle away from the charge coupler.

The techniques and systems described herein may be implemented in a number of ways. Example implementations are provided below with reference to the figures.

Figure 1:
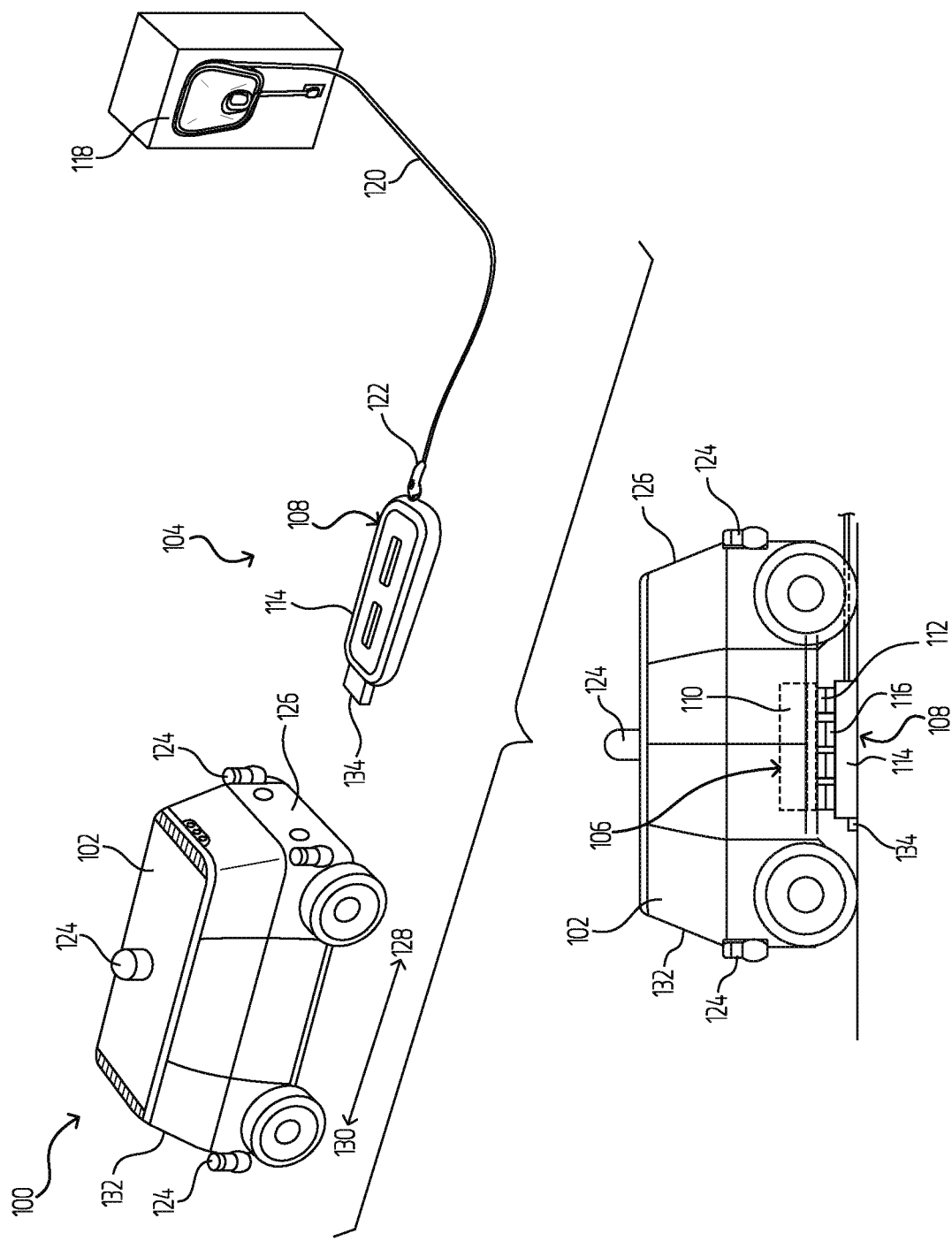
FIG. 1 is an example environment in which an example vehicle is maneuvering into position during an example recharging event.

FIG. 1 is an example environment 100 in which an example vehicle 102 is maneuvering into position during an example recharging event. The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more electric motors, one or more internal combustion engines, any combination thereof (e.g., by a hybrid power train), and/or any other suitable electric power sources. For the purpose of illustration, the example vehicle 102 is an at least partially electrically powered vehicle having two electrical propulsion units configured to provide the vehicle 102 with the ability to maneuver, each including a motor/inverter electrically coupled to one or more batteries configured to be recharged, as explained herein.

As shown in FIG. 1, the example vehicle 102 may be configured to use a charging system 104 for charging the one or more batteries coupled to the vehicle 102 and configured to provide electrical power for operation of the vehicle 102. The charging system 104 may include a charging box 106 coupled to the vehicle 102 to facilitate electrical connection to a charge coupler 108 from under the vehicle 102. For example, charging box 106 may be configured to be electrically connected to the one or more batteries of the vehicle 102 to facilitate increasing a state of charge of the one or more of the batteries. In the example shown, the charging box 106 includes a case 110 and interface electrical contacts 112, and the charge coupler 108 includes a housing 114 and complimentary coupler electrical contacts 116 configured to electrically couple the charge coupler 108 to the charging box 106 to facilitate charging of the one or more batteries coupled to the vehicle 102. For example, each of the charging box 106 and charge coupler 108 may include positive, negative, and/or ground contacts configured to make electrical contact with one another, respectively, when the vehicle 102 is positioned such that the charging box 106 is positioned over (and substantially or loosely aligned with, as explained herein) the charge coupler 108, and the respective interface electrical contacts 112 and coupler electrical contacts 116 are brought into contact with one another, as explained herein. In some examples, the case 110 of the charging box 106 may be formed from material configured to block electromagnetic interference. Although the interface electrical contacts 112 of the charging box 106 and the coupler electrical contacts 116 of the charge coupler 108 may be complimentary, they may not necessarily have a similar size and/or shape. The interface electrical contacts 112 of the charging box 106 and/or the coupler electrical contacts 116 of the charge coupler 108 may have various contact surface sizes and shapes. For example, the interface electrical contacts 112 and/or the coupler electrical contacts 116 may have circular, oblong, rectangular, square, polygonal, or the like contact surface shapes, for example, as described herein. In some examples, the interface electrical contacts 112 of the charging box 106 and the coupler electrical contacts 116 of the charge coupler 108 have substantially planar contact surfaces (e.g., planar within technical and/or manufacturing limits), for example, configured to provide respective complimentary planar contact surfaces for providing respective relatively large surface areas through which electrical current may flow. In some examples, the relatively larger surface areas may improve the speed and/or efficiency of the charging. In some examples, the interface electrical contacts 112 and/or the coupler electrical contacts 116 may be configured to be substantially or loosely aligned linearly along the longitudinal axis or the latitudinal axis of the vehicle 102. In some examples, the interface electrical contacts 112 associated with the charging box 106 may be larger (or larger in one dimension) than the coupler electrical contacts 116 of the charge coupler 108, or vice versa. In such examples, by oversizing one contact with respect to the other, the vehicle 102 need not exactly center the contacts with respect to one another. For example, if the interface electrical contacts 112 are ten centimeters larger in diameter than coupler electrical contacts 116, the vehicle 102 may move up to ten centimeters in any direction and still achieve substantially one hundred-percent contact.

The charge coupler 108 may be configured to be coupled to an electrical power source 118 and facilitate transfer of electrical power from the electrical power source 118 to the interface electrical contacts 112 of the charging box 106 when the interface electrical contacts 112 of the charging box 106 are brought into contact with the coupler electrical contacts 116 of the charge coupler 108. In some examples, the electrical power source 118 may be any source of electrical power sufficient to supply electric power for charging batteries of an electrically powered vehicle, such as, for example, an electric vehicle charging station. As shown in FIG. 1, the charge coupler 108 may include a power cable 120 coupled to an electrical connector 122 coupled to the charge coupler 108 and configured to be coupled to the electrical power source 118 to facilitate transfer of electrical power from the electrical power source 118 to the charge coupler 108. In some examples, the power cable 120 may include one or more of a positive cable, a negative cable, and a ground cable. In some examples, the electrical connector 122 may be configured to transmit one or more of data or electrical power between the charge coupler 108 and the electrical power source 118, for example, via a standard electrical connection (e.g., a standard electrical connection and/or according to a standard protocol, such as, for example, SAE J1772-CCS1, CHAdeMO, IEC-type 2, or the like).

As explained in more detail herein, to increase the state of charge of the one or more batteries of the vehicle 102, the vehicle 102 may be maneuvered to a position over the charge coupler 108, such that the interface electrical contacts 112 of the charging box 106 under the vehicle 102 are substantially, or loosely, aligned with the coupler electrical contacts 116 of the charge coupler 108 (e.g., within geometric constraints of the contacts to optimize current flow). As explained herein, in some examples, the vehicle 102 may be an autonomous vehicle, and the charging system 104 may include one or more markers that may be used by the vehicle 102 maneuver into the aligned position, for example, using a perception system including one or more sensors 124 to detect the one or more markers. In some examples, the marker(s) (e.g., fiducials) may include one or more of a physical marker (e.g., having a LIDAR reflective surface), an optical marker (e.g., a QR code, an AR tag, or the like), an RFID tag, an RF beacon. In some examples, vehicle sensors, including Wi-Fi receivers, lidar, image sensors (such as cameras), radar, time-of-flight sensors, etc., may be used to localize the vehicle 102 using a simultaneous localization and mapping (SLAM) algorithm.

For example, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

Although the example vehicle 102 has four wheels, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end 126 of the vehicle 102 is the front end of the vehicle 102 when travelling in a first direction 128, and such that the first end 126 becomes the rear end of the vehicle 102 when traveling in the opposite, second direction 130, as shown in FIG. 1. Similarly, a second end 132 of the vehicle 102 is the front end of the vehicle 102 when travelling in the second direction 130, and such that the second end 132 becomes the rear end of the vehicle 102 when traveling in the opposite, first direction 128. These example characteristics may facilitate greater maneuverability, for example, in small spaces or crowded environments, such as parking lots and urban areas.

The vehicle 102 may travel through the environment 100, relying at least in part on sensor data indicative of objects in the environment 100 in order to determine trajectories of the vehicle 102. For example, as the vehicle 102 travels through the environment 100, one or more of the sensors 124 capture data associated with detected objects (e.g., vehicles, pedestrians, buildings, barriers, etc.). The sensors 124 may include one of more image capture devices, one or more LIDAR sensors, one or more SONAR sensors, one or more RADAR sensors, or the like. The data captured by the one or more sensors 124 may be used, for example, as input for determining trajectories for the vehicle 102 (e.g., which may be used for aligning the vehicle 102 over the charge coupler 108).

Once positioned and aligned over the charge coupler 108, the interface electrical contacts 112 of the charging box 106 and the coupler electrical contacts 116 of the charge coupler 108 may be brought into contact with one another, as explained herein, so that electrical power supplied by the electrical power source 118 may flow through the power cable 120 to the coupler electrical contacts 116 of the charge coupler 108 and to the interface electrical contacts 112 of the charging box 106. The interface electrical contacts 112 of the charging box 106 may be electrically connected to the one or more batteries of the vehicle 102, and the state of charge of one or more of the batteries may be increased, for example, as explained in more detail herein. By providing the interface electrical contacts 112 of the charging box 106 coupled to the vehicle 102, so that they are accessible from the underside of the vehicle 102, unintended contact with a person may be prevented. As explained in more detail herein, some examples of the charging system 104 may be configured such that the coupler electrical contacts 116 of the charge coupler 108 may not be energized unless the vehicle 102 is in position over the charge coupler 108, thereby preventing unintended contact with a person when the coupler electrical contacts 116 of the charge coupler 108 are energized. As a result, the interface electrical contacts 112 of the charging box 106 and/or the coupler electrical contacts 116 of the charge coupler 108 may have a relatively large and robust contact surface area to increase the useful service life of the electrical contacts 112 and/or 116. In some examples, though not illustrated in FIG. 1, a physical barrier, which may or may not be formed from a conductive material (e.g., for EMI considerations) and which may be formed from a resilient (e.g., compliant) material may form a gasket around the connection from the bottom surface of vehicle 102 to the ground such that living being (human, animal, etc.) may not inadvertently make contact while the vehicle 102 is charging. As explained in detail below, a housing and/or opening mechanisms on the charge coupler 108 may provide further safety considerations by preventing the coupler electrical contacts 116 from being exposed when not in use (e.g., for example, when not engaged with the charging box 106).

In some examples, the interface electrical contacts 112 of the charging box 106 may be generally exposed as viewed from the underside of the vehicle 102. As a result, the interface electrical contacts 112 of the charging box 106 may become soiled with dirt, sand, salt, oil, and/or other grit resulting from travel on the road. Some examples of the charging system 104 may include cleaning device configured to reduce or remove such substances from the interface electrical contacts 112 of the charging box 106. For example, the cleaning device may be configured to be positioned on the support surface on which the vehicle 102 travels, so that as the vehicle 102 passes over the cleaning device, the cleaning device reduces or removes substances from the surface(s) of the interface electrical contacts 112 of the charging box 106. As several non-limiting examples, the cleaning device may deliver streams of one or more of air, water, steam, cleaning solvents, and the like to the underside of the vehicle 102 to remove debris, etc. Furthermore, such solvents may additionally, or alternatively, include compounds to remove rust, prevent corrosion, or otherwise ensure electrical connections with the interface electrical contacts 112 are optimized. This may improve physical contact between the interface electrical contacts 112 of the charging box 106 and the coupler electrical contacts 116 of the charge coupler 108, and/or prolong the useful service life of the electrical contacts 112 and/or 116. Although the cleaning device may be physically separate from the vehicle 102, in some examples, the cleaning device may be coupled to the vehicle 102. In some examples, the cleaning device may be coupled to the charge coupler 108 or may take the form of an automated service robot. In some examples, the coupler electrical contacts 116 may not be energized, for example, when charging is not occurring to increase the safety associated with the charge coupler 108 and/or to reduce safety concerns when debris is being removed from the coupler electrical contacts 116.

As shown in FIG. 1, the charging system 104 may also include an anchor 134 associated with the support surface on which the charge coupler 108 is positioned and configured to selectively hold the charge coupler 108 in position. For example, the charge coupler 108 may be intended to be either portable or fixed in location on the support surface, and the anchor 134 may be configured to selectively secure the charge coupler 108 in a fixed position or permit its repositioning using, for example, known securement assemblies, such as fasteners, clamps, etc.

Figure 2:
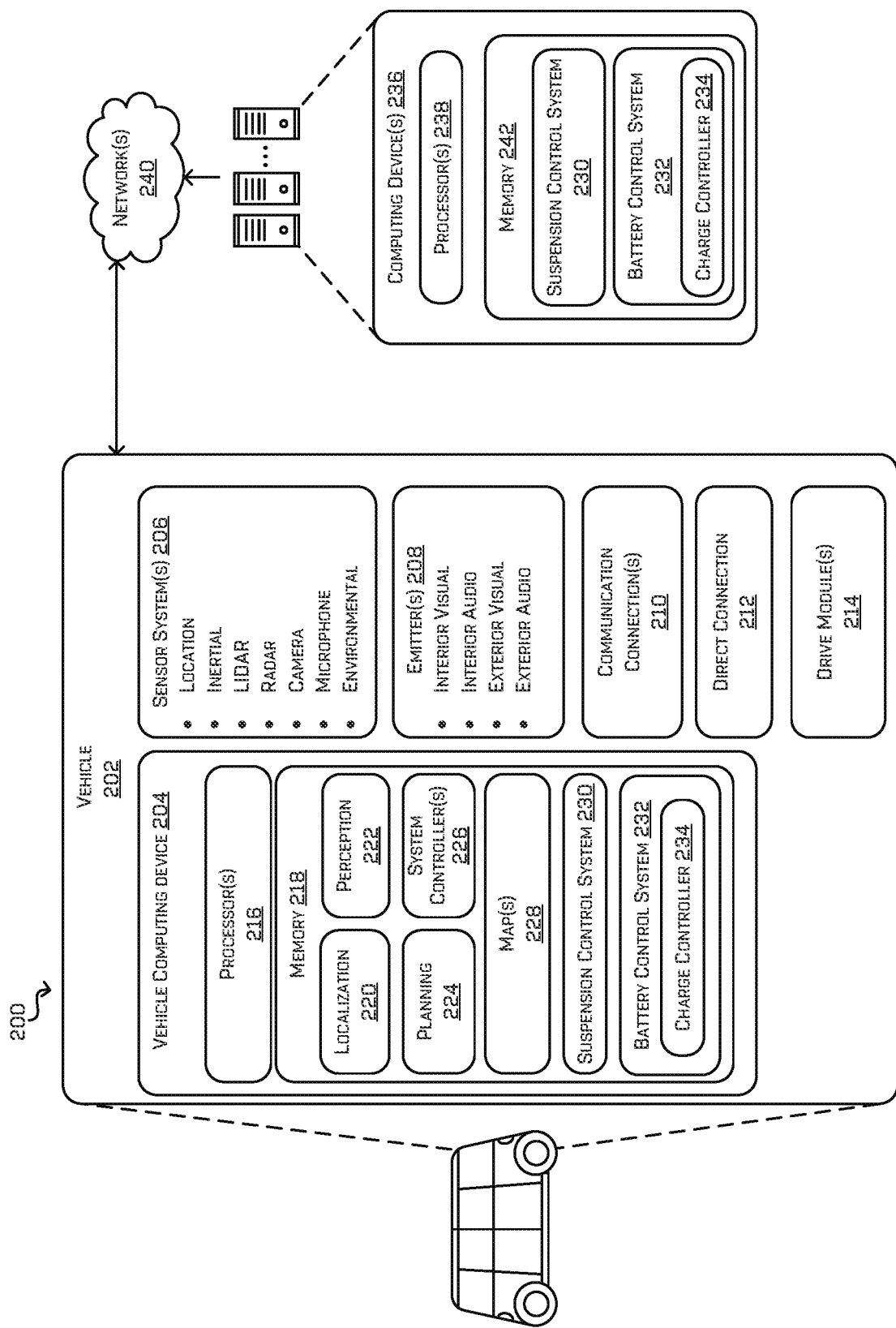
FIG. 2 is a block diagram of an example system for recharging batteries and related techniques described herein.

FIG. 2 schematically depicts a block diagram of an example system 200 for implementing the techniques described herein. In at least some examples, the system 200 may include a vehicle 202, which may correspond to the example vehicle 102 shown in FIG. 1. The vehicle 202 may include a vehicle computing device 204, one or more sensor systems 206, one or more emitters 208, one or more communication connections 210, at least one direct connection 212, and one or more drive modules 214.

The vehicle computing device 204 may include one or more processors 216 and memory 218 communicatively coupled with the one or more processors 216. In the illustrated example, the vehicle 202 is an autonomous vehicle. However, the vehicle 202 may be any other type of vehicle. In the illustrated example, the memory 218 of the vehicle computing device 204 stores a localization component 220, a perception component 222, a planning component 224, one or more system controllers 226, one or more maps 228, a suspension control system 230, a battery control system 232 including a charge controller 234. Though depicted in FIG. 2 as residing in memory 218 for illustrative purposes, it is contemplated that the localization component 220, the perception component 222, the planning component 224, the one or more system controllers 226, the one or more maps 228, the suspension control system 230, and/or the battery control system 232 may additionally, or alternatively, be accessible to the vehicle 202 (e.g., stored on, or otherwise accessible by, memory remote from the vehicle 202).

In at least one example, the localization component 220 may be configured to receive data from the sensor system(s) 206 to determine a position and/or orientation of the vehicle 202 (e.g., one or more of an x-, y-, z-position, roll, pitch, or yaw). For example, the localization component 220 may include and/or request/receive a map of an environment and may continuously determine a location and/or orientation of the autonomous vehicle within the map. In some examples, the localization component 220 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 220 may provide data to various components of the vehicle 202 to determine an initial position of an autonomous vehicle for generating a candidate trajectory, as discussed herein.

In some examples, the perception component 222 may be configured to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional and/or alternative examples, the perception component 222 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 224 may determine a path for the vehicle 202 to follow to traverse through an environment. For example, the planning component 224 may determine various routes and trajectories and various levels of detail. For example, the planning component 224 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 202 to navigate.

In at least one example, the planning component 224 may determine a location of a user based on image data of an environment received from the user using, for example, bags of binary words with image based features, artificial neural network, and the like. Further, the planning component 224 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 202 may stop to pick up a passenger. In at least one example, the planning component 224 may determine a pickup location based at least in part on determining a user identity (e.g., determined via image recognition or received as an indication from a user device, as discussed herein).

In at least one example, the vehicle computing device 204 may include one or more system controllers 226, which may be configured to control steering, propulsion, braking, safety, emitters, communication, and other systems of the vehicle 202. These system controller(s) 226 may communicate with and/or control corresponding systems of the drive module(s) 214 and/or other components of the vehicle 202.

The memory 218 may further include one or more maps 228 that may be used by the vehicle 202 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment, and may be loaded into working memory as needed. In at least one example, the one or more maps 228 may include at least one map (e.g., images and/or a mesh). In some example, the vehicle 202 may be controlled based at least in part on the maps 228. That is, the maps 228 may be used in connection with the localization component 220, the perception component 222, and/or the planning component 224 to determine a location of the vehicle 202, identify objects in an environment, and/or generate routes and/or trajectories to navigate within an environment.

In some examples, the one or more maps 228 may be stored on a remote computing device(s) (such as the computing device(s) 236 including one or more processors 238) accessible via network(s) 240. In some examples, multiple maps 228 may be stored based on, for example, a characteristic (e.g., type of entity, time of day, day of week, season of the year, etc.). Storing multiple maps 228 may have similar memory requirements, but increase the speed at which data in a map may be accessed.

As shown in FIG. 2, in some examples, the suspension control system 230 and/or the battery control system 232 may be stored in the memory 218 of the computing device 204 of the vehicle 202 or remote from the vehicle 202 in the memory 242 of the computing device(s) 236. In some examples, some portions of the suspension control system 230 and/or the battery control system 232 may be stored in the memory 218 of the computing device 204 of the vehicle 202, and other portions of suspension control system 230 and/or the battery control system 232 may be stored remotely in the memory 242 of the computing device(s) 236, and the separately located portions of the suspension control system 230 and/or the battery control system 232 may operate together in a coordinated manner, respectively.

In some examples, aspects of some or all of the components discussed herein may include any models, algorithms, and/or machine learning algorithms. For example, in some examples, the components in the memory 218 and/or the memory 242 may be implemented as a neural network.

As described herein, an exemplary neural network is a biologically inspired algorithm which passes input data through a series of connected layers to produce an output. Each layer in a neural network may also include another neural network, or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 206 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 206 may include multiple examples of each of these or other types of sensors. For example, the LIDAR sensors may include individual LIDAR sensors located at the corners, front, back, sides, and/or top of the vehicle 202. As another example, the camera sensors may include multiple cameras disposed at various locations about the exterior and/or interior of the vehicle 202. The sensor system(s) 206 may provide input to the vehicle computing device 204. Additionally, or alternatively, the sensor system(s) 206 may send sensor data, via the one or more networks 240, to the one or more computing device(s) 236 at a particular frequency, after a lapse of a predetermined period of time, in near real-time, etc.

The vehicle 202 may also include one or more emitters 208 for emitting light and/or sound, as described above. The emitters 208 in this example include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 202 may also include one or more communication connection(s) 210 that enable communication between the vehicle 202 and one or more other local or remote computing device(s). For example, the communication connection(s) 210 may facilitate communication with other local computing device(s) on the vehicle 202 and/or the drive module(s) 214. Also, the communication connection(s) 210 may allow the vehicle 202 to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 may include physical and/or logical interfaces for connecting the vehicle computing device 204 to another computing device or a network, such as network(s) 240. For example, the communications connection(s) 210 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 may include one or more drive modules 214. In some examples, the vehicle 202 may have a single drive module 214. In at least one example, if the vehicle 202 has multiple drive modules 214, individual drive modules 214 may be positioned on opposite ends of the vehicle 202 (e.g., the front and the rear, etc.). In at least one example, the drive module(s) 214 may include one or more sensor systems to detect conditions of the drive module(s) 214 and/or the surroundings of the vehicle 202. By way of example and not limitation, the sensor system(s) 206 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 214. In some cases, the sensor system(s) on the drive module(s) 214 may overlap or supplement corresponding systems of the vehicle 202 (e.g., sensor system(s) 206).

The drive module(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 214 may include a drive module controller, which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 214. Furthermore, the drive module(s) 214 also include one or more communication connection(s) that enable communication by the respective drive module with one or more other local or remote computing device(s).

In at least one example, the direct connection 212 may provide a physical interface to couple the one or more drive module(s) 214 with the body of the vehicle 202. For example, the direction connection 212 may allow the transfer of energy, fluids, air, data, etc. between the drive module(s) 214 and the vehicle 202. In some examples, the direct connection 212 may further releasably secure the drive module(s) 214 to the body of the vehicle 202.

In at least one example, the localization component 220, perception component 222, the planning component 224, the suspension control system 230, and/or the battery control system 232 may process sensor data, as described above, and may send their respective outputs, over the one or more network(s) 240, to one or more computing device(s) 236. In at least one example, the localization component 220, the perception component 222, the planning component 224, the suspension control system 230, and/or the battery control system 232 may send their respective outputs to the one or more computing device(s) 236 at a particular frequency, after a lapse of a predetermined period of time, in near real-time, etc.

The processor(s) 216 of the vehicle 202 and/or the processor(s) 238 of the computing device(s) 236 may be any suitable processor capable of executing instructions to process data and perform operations as described herein. By way of example and not limitation, the processor(s) 216 and 238 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 218 and 242 are examples of non-transitory computer-readable media. The memory 218 and 242 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 2 is illustrated as a distributed system, in alternative examples, components of the vehicle 202 may be associated with the computing device(s) 236, and/or components of the computing device(s) 236 may be associated with the vehicle 202. That is, the vehicle 202 may perform one or more of the functions associated with the computing device(s) 236, and vice versa.

Figure 3:
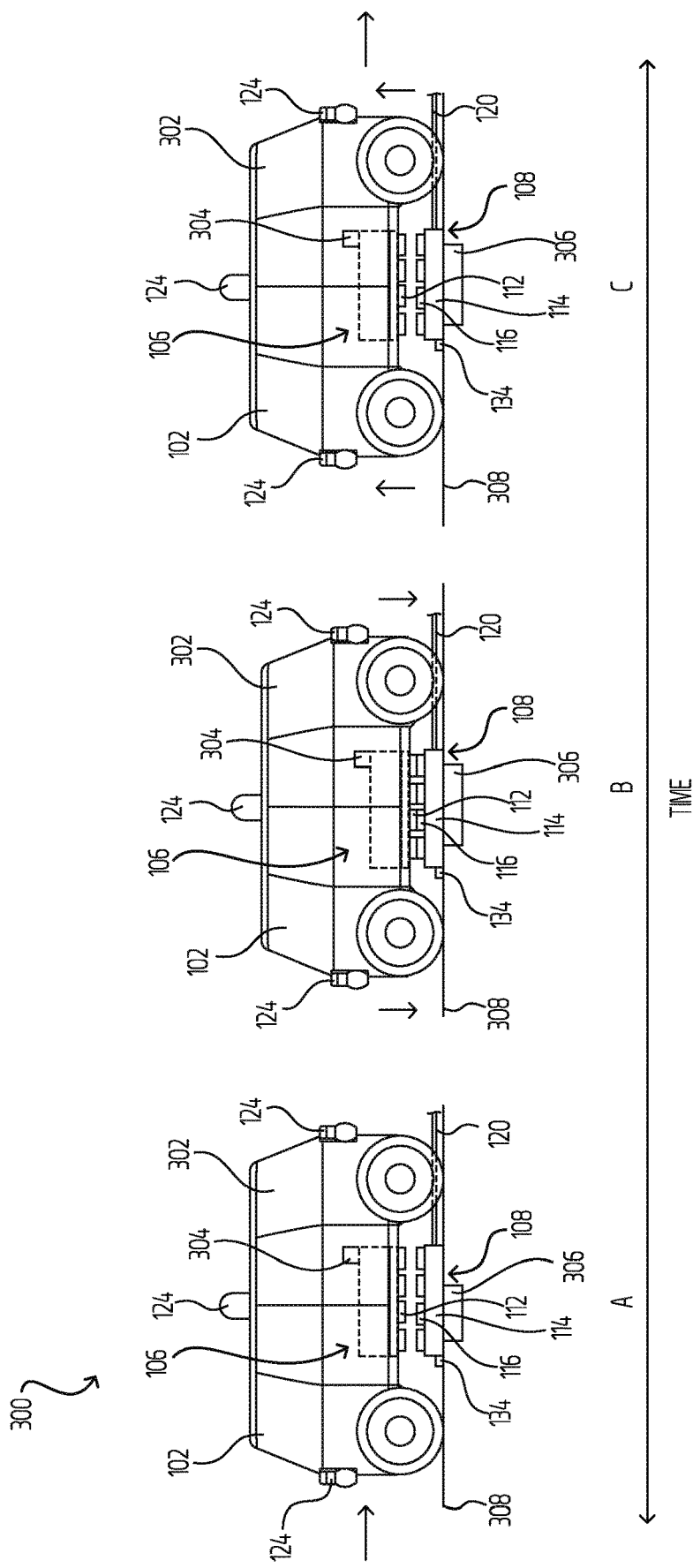
FIG. 3 is an example diagrammatic representation of an example vehicle recharging sequence.

FIG. 3 is an example diagrammatic representation of an example vehicle recharging sequence 300 in which the example vehicle 102 maneuvers to a position over the charge coupler 108 at time corresponding to A, causes the interface electrical contacts 112 of the charging box 106 to come into contact with the coupler electrical contacts 116 of the charge coupler 108 at a time corresponding to B so that electrical power can be transferred to one or more batteries of the vehicle 102, and cause separation of the interface electrical contacts 112 and the coupler electrical contacts 116 from one another at a time corresponding to C, so that the vehicle 102 can maneuver away from the charge coupler 108.

In some examples of the sequence 300, providing electrical contact between the interface electrical contacts 112 of the charging box 106 and the coupler electrical contacts 116 of the charge coupler 108 (at B) may include one or more of lowering the vehicle 102 or raising the charge coupler 108. For example, as shown in FIG. 3, the vehicle 102 may include an active or adjustable suspension system (see FIG. 4) configured to, for example, raise and lower the ride height of the vehicle 102, and provide electrical contact between the interface electrical contacts 112 of the charging box 106 and the coupler electrical contacts 116 of the charge coupler 108. For example, a chassis 302 of the vehicle 102 may be lowered via the suspension system until the interface electrical contacts 112 and the coupler electrical contacts 116 contact one another. In some examples, the chassis 302 of vehicle 102 may be lowered such that the interface electrical contacts 112 remain substantially level. In some examples, the interface electrical contacts 112 may be configured to move relative to the vehicle 102. For example, the charging box 106 including the interface electrical contacts 112 may be mounted to move relative to the chassis 302, for example, via an actuator 304 (e.g., an electric, pneumatic, and/or hydraulic actuator), until the interface electrical contacts 112 and the coupler electrical contacts 116 of the charge coupler 108 contact one another. In some examples, the charge coupler 108 may be configured to raise toward the underside of the vehicle 102, so that the coupler electrical contacts 116 of the charge coupler 108 are contacted with the interface electrical contacts 112 of the charging box 106. For example, the charge coupler 108 may be mounted to an actuator 306 (e.g., an electric, pneumatic, and/or hydraulic actuator)

configured to raise the charge coupler 108, for example, relative to the support surface 308 on which the charge coupler 108 is mounted (e.g., the ground or floor of a service center). In some such examples, the vehicle 102 and the charge coupler 108 may be configured to communicate with one another, for example, via wireless signals (e.g., wireless signals, such as, for example, BTLE, 802.11x, LTE, NFC (or other inductive coupling)), or otherwise with the vehicle 102 sending a command (e.g., via a network). In some examples, the chassis 302 of the vehicle 102 and/or the charging box 106 may lower itself, and the charge coupler 108 may rise toward the charging box 106, so that the electrical contacts 112 and 116 contact one another.

Figure 4:
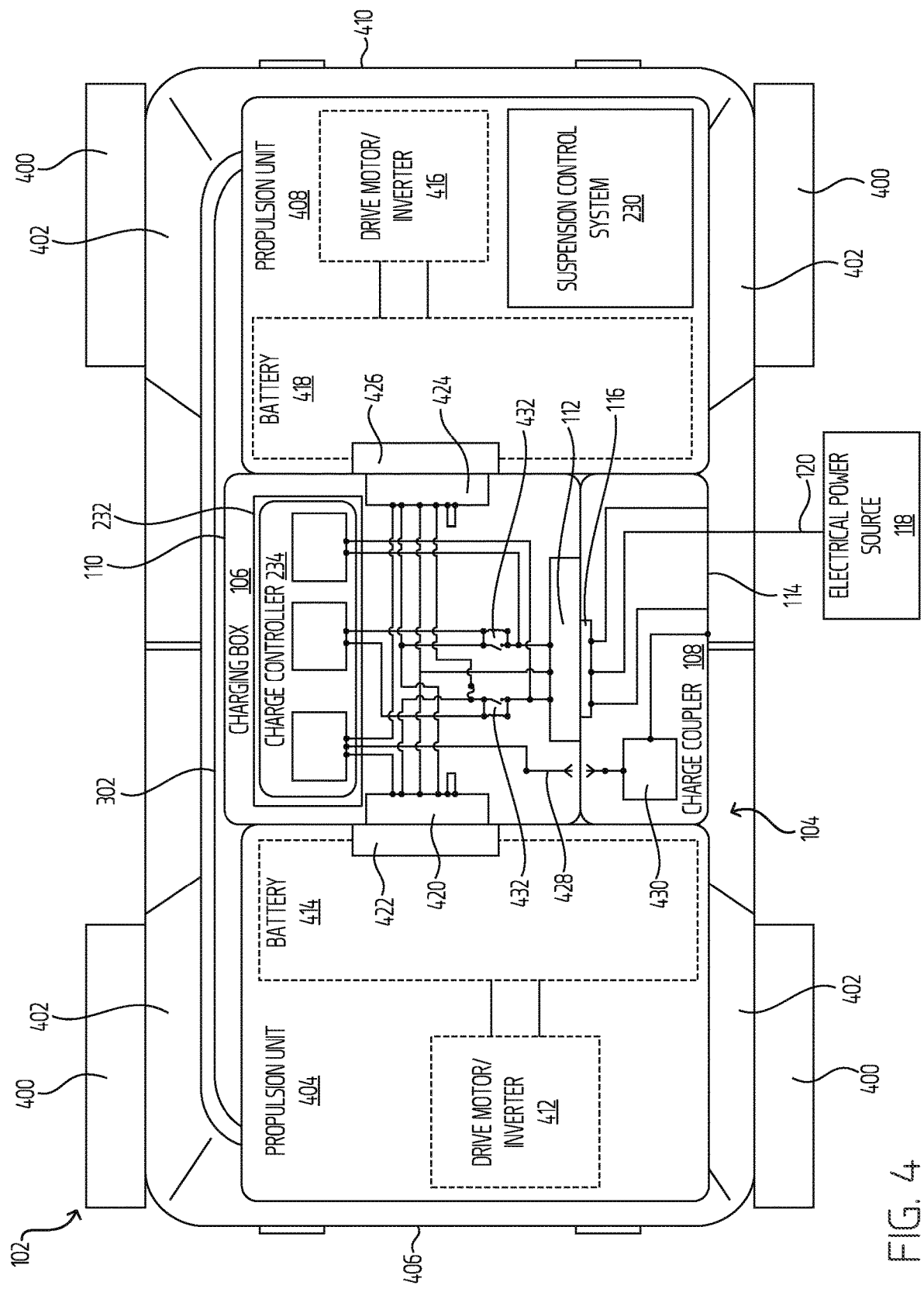
FIG. 4 is a schematic diagram of an example vehicle and an example system for charging one or more batteries coupled to the vehicle.

FIG. 4 is a schematic diagram of an example vehicle 102 and an example charging system 104 for charging one or more batteries coupled to the vehicle 102. Although FIG. 4 schematically depicts relative orientations and relative positions of various components, for example, the example vehicle 102, the example charge coupler 108, and the example electrical power source 118, both of which may be physically separate from the vehicle 102, other relative orientations and relative positions are contemplated. For example, although for the sake of explanation the charge coupler 108 is schematically depicted as apparently positioned within the vehicle 102, the charge coupler 108 is separate from the vehicle 102, and the coupler electrical contacts 116 of the charge coupler 108 may be selectively contacted with, and separated from, the interface electrical contacts 112 of the vehicle 102, as explained herein. FIG. 4 schematically depicts the coupler electrical contacts 116 of the charge coupler 108 contacting the interface electrical contacts 112 of the vehicle 102. Other components described with respect to FIG. 4 may have other relative positions and/or relative orientations.

The example vehicle 102 shown in FIG. 4 includes four wheels 400 coupled a chassis 302 via a suspension system 402 (e.g., an adjustable and/or active suspension system configured to alter a distance between the chassis 302 and the support surface 308 supporting the vehicle 102), a first electrical propulsion unit 404 coupled adjacent a first end 406 of the chassis 302, and a second electrical propulsion unit 408 coupled adjacent a second end 410 of the chassis 302 opposite the first end 406 of the chassis 302. In some examples, the suspension system 402 may be active suspension and may include adjustable springs and/or dampers configured to lower and/or raise the ride height of the vehicle 102 (e.g., change the distance between the lower side of the chassis 402 and the support surface 308 (FIG. 3) on which the vehicle 102 is supported by its wheels 400). In some examples, the first and second electrical propulsion units 404 and 408, respectively, are configured to supply torque to two or more (e.g., four) of the wheels 400 for maneuvering the vehicle 102. As shown in FIG. 4, in some examples, the first electrical propulsion unit 404 includes a first drive motor/inverter 412 and a first battery 414 electrically coupled to the first electrical propulsion unit 404 and configured to supply and/or receive electrical power to and/or from the first drive motor/inverter 412. Similarly, the second electrical propulsion unit 408 includes a second drive motor/inverter 416 and a second battery 418 electrically coupled to the second electrical propulsion unit 408 and configured to supply and/or receive electrical power to and/or from the second drive motor/inverter 416. In some examples, the first battery 414 and/or the second battery 418 may each include more than one battery, such as two or more batteries electrically connected in series or parallel to one another.

As shown schematically in FIG. 4, the example vehicle 102 includes the charging box 106 including the interface electrical contacts 112 configured to provide electrical communication between the first and second batteries 414 and 418 and the charge coupler 108, which is shown schematically in electrical contact with the charging box 106, such that the interface electrical contacts 112 of the charging box 106 are in electrical contact with the coupler electrical contacts 116 of the charge coupler 108. The example charging system 104 shown in FIG. 4 also includes an electrical power source 118 electrically coupled to the charge coupler 108 via the power cable 120.

In the example shown, the charging box 106 also includes an electrical connector 420 positioned on the case 110 of the charging box 106 at an end of the case 110 adjacent the first electrical propulsion unit 404 for electrically coupling the charging box 106 to the first battery 414 of the first electrical propulsion unit 404 via, for example, an electrical connector 422 of the first electrical propulsion unit 404. The example charging box 106 also includes an electrical connector 424 positioned on the case 110 at an end of the case 110 adjacent the second electrical propulsion unit 408 for electrically coupling the charging box 106 to the second battery 418 of the second electrical propulsion unit 408 via, for example, an electrical connector 426 of the second electrical propulsion unit 408. Though illustrated as two electrical connectors 422 and 424 in FIG. 4, any number of connectors is contemplated (e.g., none, where the charging box 106 is electrically integrated with the one or more batteries, one connector, or more connectors than two, etc.).

In the example shown in FIG. 4, the charging system 104 also includes an electrical power transmitter 428 configured to transmit electrical power to the charge coupler 108. For example, the charging box 106 may include the electrical power transmitter 428, which may include an NFC transmitter configured to activate the charge coupler 108 based at least in part on a distance between the NFC transmitter and a receiver 430 electrically coupled to the charge coupler 108. In some examples, the transmitter 428 may be physically incorporated into the charging box 106, or in some examples, the transmitter 428 may be physically incorporated into the vehicle 102 but remotely from the charging box 106. In some examples, the receiver 430 may include an NFC receiver, and the NFC transmitter 428 associated with the vehicle 102 and NFC receiver 430 may be configured such that electrical power is transmitted from the NFC transmitter 428 to the NFC receiver 430 when the NFC transmitter 428 and NFC receiver 430 are within transmission range of one another. In some such examples, the charge coupler 108 may be prevented from being activated until and/or unless the vehicle 102 is positioned over the charge coupler 108, and in some examples, positioned so that the interface electrical contacts 112 of the charging box 106 and the coupler electrical contacts 116 of the charge coupler 108 may be brought into contact with one another. In some examples, the charge coupler 108 may be configured to transmit a signal back to the charging box 106 to confirm contact between the interface electrical contacts 112 of the charging box and the coupler electrical contacts 116 of the charge coupler 108. In some examples, the charge coupler 108 may also transmit one or more signals to the vehicle 102 (e.g., a controller of the vehicle 102) confirming that the vehicle 102 is in a suitable position for charging to occur. In some examples, the transmitter 428 may be a transceiver capable of receiving signals, for example, transmitted by the receiver 430, which may in some examples be a transceiver. In some examples, one or more of the charging box 106 or the charge coupler 108 may have separate a receiver and a separate transmitter. In some examples, upon receipt of the one or more signals from the charge coupler 108, the vehicle 102 may be prevented from drive capability and/or the suspension 402 may be locked in place, for example, so that the vehicle 102 may not be able to raise up and disconnect the interface electrical contacts 112 of the charging box 106 from the coupler electrical contacts 116 of the charge coupler 108, unless charging has been discontinued and/or the coupler electrical contacts 116 of the charge coupler 108 have been de-energized.

This may increase the safety of the charging system 104 by reducing the likelihood that a person contacts one or more of the coupler electrical contacts 116 of the charge coupler 108 when the coupler electrical contacts 116 are energized, thereby potentially preventing possible electric shock. Other types of transmitters and receivers are contemplated. As a non-limiting example, control circuitry contained in the charge coupler 108 may be self-contained (e.g., isolated from power provided from the electrical power source 118), so that it is powered exclusively by power received wirelessly via the receiver 430. The example charging system 104 shown in FIG. 4 also includes a charge controller 234 configured to distribute charging between the first battery 414 and the second battery 418. Once power is received, control circuitry may interact with other components of the system, such as, but not limited to, sending a signal (either wired or via a wireless communication, such as, but not limited to, BlueTooth, WiFi, NFC, etc.) to the electrical power source 118 to send power, sending a signal to the charge controller 234 to energize the interface electrical contacts 112, sending a signal to the vehicle 102 to lower an active suspension, or otherwise control one or more functions necessary to convey electric power from the electrical power source 118 to the one or more batteries (e.g., battery 414 and 418) of the vehicle 102.

In some examples, the charge controller 234 may balance the respective states of charge of each of the first and second batteries 414 and 418. For example, the charge controller 234 may be configured to determine which of the first and second batteries 414 and 418 is at a relatively lower state of charge, and charge that battery until its state of charge substantially matches the state of charge of the other battery. In some examples, thereafter the charge controller 234 may charge the first and second batteries 414 and 418 concurrently or substantially simultaneously until they each reach a desired state of charge. In the example shown in FIG. 4, the charge controller 234 is physically incorporated into the charging box 106. In some examples, the charge controller 234 may be physically incorporated into the vehicle 102 but remotely from the charging box 106.

The example shown in FIG. 4 also includes switches 432 configured to selectively electrically connect the interface electrical contacts 112 of the charging box 106 with the first and second batteries 414 and 418. In some such examples, closing the switches 432 may facilitate the transfer of electrical power from the electrical power source 118 to the first and second batteries 414 and 418, and conversely disconnect the electrical power source 118 from the first and second batteries 414 and 418. For example, charge controller 234 may be configured to facilitate electrical connection between the electrical power source 118 and the first and second batteries 414 and 418 by controlling operation of the switches 432. For example, charge controller 234 in some examples may be configured to detect contact between the coupler electrical contacts 116 of the charge coupler 108 and the interface electrical contacts 112 of the charging box 106, and based at least in part on the detection, close one or more of the switches 432 to electrically connect the electrical power source 118 to the first and second batteries 414 and 418 for increasing the state of charge of the first and second batteries 414 and 418. In some examples, the charge controller 234 may be configured to detect contact by one or more of receiving data from circuitry powered by receipt of the transmission from the transmitter 428, detecting a current, temperature, voltage, or other impedance from the inductive coupling, or detecting an impedance across the interface electrical contacts 112 of the charging box 106.

In some examples, the charging system 104 may be configured to determine termination of charging. For example, the charging system 104 may be configured to monitor voltage and/or the state of charge of one or more of the batteries 414 and/or 418, and when a threshold has been reached, terminate the charging. In some examples, the charging system 104 may be configured to receive one or more signals from the vehicle 102 indicative that the vehicle 102 is initiating termination of the charging. Under such circumstances, the charging system 104 may cause decoupling of the interface electrical contacts 112 of the charging box 106 from the coupler electrical contacts 116 of the charge coupler 108, for example, as explained herein. In some examples, prior to decoupling, the coupler electrical contacts 116 of the charge coupler 108 may be de-energized, for example, by disconnecting the electrical power source 118 from the coupler electrical contacts 116 of the charge coupler 108. In some example, the vehicle 102 may receive a signal from a network indicating that it should discontinue charging. As a non-limiting example, in the event of an emergency, the vehicle 102 may need to respond to a situation regardless of whether the vehicle 102 has completed charging.

In some examples, the charge controller 234 may be configured to detect a voltage decay in the interface electrical contacts 112 of the charging box 106 before and/or following the separation of the interface electrical contacts 112 of the charging box 106 and the coupler electrical contacts 116 of the charge coupler 108 the from one another. For example, the charge controller 234 may be configured to receive one or more signals from the interface electrical contacts 112 of the charging box 106 indicative of the voltage at the interface electrical contacts 112. In some examples, if the charge controller 234 receives one or more signals indicative that the voltage of the interface electrical contacts 112 is dropping, the charge controller 234 may communicate one or more signals to the vehicle 102 (e.g., to a controller of the vehicle 102) indicating that the vehicle 102 may maneuver away from the charge coupler 108. In some examples, if the charge controller 234 receives one or more signals indicative that the voltage of the interface electrical contacts 112 of the charging box 106 is not dropping, the charge controller 234 may communicate one or more signals to the vehicle 102 indicating that the vehicle 102 should remain in position over the charge coupler 108. The one or more signals indicative of the failure of the voltage to drop may be an indication that the coupler electrical contacts 116 of the charge coupler 108 are still receiving electrical power from the electrical power source 118, and thus, the vehicle 102 may be prevented from maneuvering away from the charge coupler 108, so that the coupler electrical contacts 116 of the charge coupler 108 are not exposed while energized. This may provide improved safety by preventing a person from accessing the coupler electrical contacts 116 of the charge coupler 108 when they are still energized.

FIGS. 5A, 5B, and 5C show a perspective view of an example charge coupler 108 during an example sequence 500 opening example doors 502 of the charge coupler 108 and exposing example coupler electrical contacts 116. FIGS. 5D and 5E show a perspective view of the example charge coupler 108 during an example sequence 504 closing the example doors 502 of the charge coupler 108 and enclosing the example coupler electrical contacts 116 within the charge coupler 108.

In some examples, the charge coupler 108 may include an electrical connector configured to be coupled to an electrical power source, for example, the electrical power source 118 shown in FIGS. 1, 7 and 9. The example charge coupler 108 also includes coupler electrical contacts 116 (see FIGS. 5B-5D) configured to be electrically coupled to one or more interface electrical contacts 112 associated with a vehicle 102 from under the vehicle 102, for example, the interface electrical contacts 112 of the charging box 106 shown in FIG. 1. The charge coupler 108 may also include a housing 114 for enclosing the coupler electrical contacts 116 therein. For example, the housing 114 may include a base 506 configured to be supported by a support surface 308 and support the coupler electrical contacts 116. For example, mounting fixtures 508 (see also FIGS. 6A-6C) may be coupled to the base 506, and the mounting fixtures 508 may be configured to support one or more of the coupler electrical contacts 116 within the housing 114, for example, as described herein. In some examples, the mounting fixtures 508 may each include a biasing member (e.g., a spring or resilient member) configured to bias the coupler electrical contacts 116 to extend away from the base 506, which may result in improving the electrical contact between the interface electrical contacts 112 and the coupler electrical contacts 116 during charging. As shown in FIGS. 5A-5E, the housing 114 may also include a coupler activation surface 510 opposite the base 506. In some examples, the coupler activation surface 510 may be configured to be contacted by a lower surface of the vehicle 102, such as, for example, a portion of the charging box 106, as described herein.

As shown in FIGS. 5A-5E, the housing 114 may also include one or more openings 512 associated with the coupler activation surface 510. For example, the housing 114 may include a barrier 514 opposite the base 506 and coupled to the coupler activation surface 510, and the barrier 514 may define the one or more openings 512, which may be opened to expose one or more of the coupler electrical contacts 116. In some examples, the coupler activation surface 510 extends at least partially around a periphery of the barrier 514, and the barrier 514 moves with the coupler activation surface 510.

As shown in FIGS. 5A-5E, the housing 114 may include one or more doors 502 for one or more of the openings 512 (e.g., each of the openings 512). The one or more doors 502 may be configured to move between a first position closing the one or more openings 512 (see FIG. 5A) and a second position opening the one or more openings 512 (see FIG. 5C) and exposing the one or more coupler electrical contacts 116. When in the first position, the one or more doors 502 may serve to prevent entry of water and/or dirt into the interior of the housing 114. Some examples may include a gasket or seal material associated with one or more of the doors 502 or the openings 512. When in the second position, the one or more doors 502 (being opened) may enable contact between the interface electrical contacts 112 of the charging box 106 and the coupler electrical contacts 116 of the charge coupler 108, thereby permitting electrical power communication between the electrical contacts 112 and 116.

In some examples, the housing 114 may also include a peripheral portion 516 coupling the base 506 and the coupler activation surface 510 to one another, for example, such that the coupler activation surface 510 is moveable relative to the base 506 between an extended position, for example, as shown in FIG. 5A and a compressed position, for example, as shown in FIG. 5C. In some examples, the peripheral portion 516 may include a flexible material forming a seal between the base 506 and the coupler activation surface 510, such as, for example, a rubber-like material. In some examples, the peripheral portion may include a resilient material configured to resist movement of the coupler activation surface 510 toward the base 506 and/or bias the coupler activation surface 510 toward the extended position. In some examples, one or more biasing members, such as, for example, helical springs or other spring-types, may be associated with the housing 114 and/or the peripheral portion 516 (e.g., inside the housing 114) to bias the coupler activation surface 510 toward the extended position. In some examples, an effective spring constant (e.g., an actual spring constant) associated with the one or more biasing members and/or the peripheral portion 516 may be determined based at least in part on the weight of the vehicle 102. In some examples, the coupler activation surface 510 may be formed from a relatively harder and/or less flexible material than the peripheral portion 516.

In some examples, the coupler activation surface 510 forms a lip 518 at least partially (e.g., fully) extending around the barrier 514, for example, such that the lip 518 is raised relative to an upper surface of the barrier 514. In some examples, the lip 518 and or portions of the peripheral portion 516 may include one or more passages 520 configured to permit fluid to drain from the barrier 514 outward and away from the one or more doors 502 and exterior relative to the peripheral portion 516, thereby preventing liquid from collecting on top of the barrier 514 and passing through the one or more openings 512 when the one or more doors 502 open, for example, during a charging sequence. In some examples, the barrier 514 may be shaped to present a slightly convex surface relative to exterior with respect to the housing 114, for example, to promote drainage of liquid through the one or more passages 520.

FIGS. 5A-5C show an example opening sequence 500 during an example charging operation. For example, in order to increase the level of charge of one or more batteries carried by a vehicle, the vehicle may approach the charge coupler 108 and may be maneuvered to a position over the charge coupler 108, such that one or more electrical contacts coupled to the vehicle may be substantially above the charge coupler 108, for example, such that the coupler activation surface 510 of the charge coupler 108 faces underside of the vehicle. For example, the vehicle may have a charging box 106 mounted to its underside such that the interface electrical contacts 112 are substantially aligned with (or loosely aligned with, for example, as described with respect to FIGS. 10A-10D) the coupler electrical contacts 116 of the charge coupler 108. In some such examples, a surface associated with the interface electrical contacts 112 may be lowered toward the charge coupler 108, for example, such that the surface contacts the coupler activation surface 510 of the charge coupler 108. Thereafter, the surface associated with the interface electrical contacts 112 may be lowered further, such that the surface forces the coupler activation surface 510 to move from the extended position, for example, as shown in FIG. 5A, toward the base 506 and expose the one or more coupler electrical contacts 116 of the charge coupler 108 to the underside of the vehicle, for example, as shown in FIG. 5B. In some such examples, the weight of the vehicle may be used to force the coupler activation surface 510 toward the base 506, for example, using an adjustable suspension system, as described herein.

As shown in FIG. 5B, movement of the coupler activation surface 112 may also result in the one or more doors 502 at least beginning to open to at least partially expose the coupler electrical contacts 116, for example, as shown in FIG. 5B. As explained in more detail with respect to FIGS. 6A-6C, in some examples, the housing 114 may include a linkage coupling the coupler activation surface 510 to the one or more doors 502, such that as the coupler activation surface 510 moves from the extended position toward the base 506 and/or the support surface 308 to the compressed position, the linkage causes the one or more doors 502 to move from the first position (e.g., a closed position), as shown in FIG. 5A, to the second position (e.g., an at least partially open position), as shown in FIGS. 5B and 5C.

As the surface associated with the vehicle continues to lower toward the base 506, the surface forces the coupler activation surface 510 to move to the compressed position, for example, as shown in FIG. 5C, thereby further exposing the one or more coupler electrical contacts 116 of the charge coupler 108 to the underside of the vehicle. In some examples, movement of the coupler activation surface 112 may also result in the one or more doors 502 becoming fully opened, for example, as shown in FIG. 5C. This may result in the one or more interface electrical contacts 112 associated with the vehicle contacting the one or more coupler electrical contacts 116 of the charge coupler 108, and thereafter, the one or more batteries of the vehicle may be electrically coupled to the electrical power source 118 via the one or more coupler electrical contacts 116 of the charge coupler 108 and the one or more interface electrical contacts 112, for example, as described herein. In some examples, when the coupler activation surface 510 is in the compressed position, the one or more coupler electrical contacts 116 extend through the corresponding opening 512, such that respective ends of the coupler electrical contacts 116 remote from the base 506 extend beyond a plane in which the respective opening 512 lies.

As shown in FIGS. 5D and 5E, the example closing sequence 504 may begin with raising the surface of the vehicle contacting the coupler activation surface 510, such that the coupler activation surface 510 is able to raise relative to the base 506, and separating the interface electrical contacts 112 from the coupler electrical contacts 116, so that they are no longer in electrical communication with one another. As shown in FIGS. 5D and 5E, in some examples, the coupler activation surface 510 may be biased toward the extended position (e.g., via resilience of the peripheral portion 516 and/or one or more biasing members, such as, for example, one or more springs in the housing 114 coupled to the base 506 and the coupler activation surface 510, either directly or indirectly), and as the surface associated with the vehicle raises away from the base 506, the coupler activation surface 510 also moves away from the base 506 toward the extended position. In some examples, the one or more doors 502 may move from the second open position to the first closed position, thereby closing the one or more openings 512 and enclosing the coupler electrical contacts 116 inside the housing 114. Thereafter, the vehicle may be maneuvered away from the charge coupler 108.

FIGS. 6A, 6B, and 6C are perspective views of an interior of an example housing 114 of an example charge coupler 108 during an example sequence 600 opening the one or more doors 502 of the housing 114. As shown in FIGS. 6A-6C, some examples of the housing 114 may include a linkage 602 coupling the coupler activation surface 510 (e.g., via the barrier 514 in some examples) to the one or more doors 502, such that as the coupler activation surface 510 and/or the barrier 514 moves from the extended position toward the base 506 to the compressed position, the one or more doors 502 move from the first closed position to the second open position. For example, the linkage 602 may be coupled to the base 506, the coupler activation surface 510 (e.g., via the barrier 514), and/or one or more of the doors 502. In some examples, the linkage 602 may include at least one of one or more links, one or more gears, one or more oscillators, one or more actuators, one or more springs, one or more crank mechanisms, one or more rocker mechanisms, or one or more slide mechanisms. In some examples, a biasing member may be coupled to the linkage 602 and configured to bias the coupler activation surface 510 and/or the barrier 514 toward the extended position. The biasing member may include a helical spring, a torsion spring, and/or any other known suitable type of biasing member. As shown in FIGS. 6A-6C, the linkage 602 may be configured to pivot one or more of the doors 502 through an arc A between the first closed position, for example, shown in FIG. 6A, and the second open position, for example, as shown in FIG. 6C.

The housing 114, in some examples, may include more than a single linkage 602. For example, the housing 114 shown in FIGS. 6A-6C includes several linkages 602, each coupled to a single door 502. Other combinations of linkages 602 and doors 502 are contemplated. Each of the example linkages 602 shown in FIGS. 6A-6C includes a reaction link 604 coupled to an interior side of the barrier 514 (and the coupler activation surface 510 via the barrier 514), for example, via a non-pivoting connection. As the barrier 514 moves toward and away from the base 506, the reaction link 604 moves with the barrier 514, for example, without pivoting. The example linkage 602 also includes a transfer link 606 pivotally coupled to the reaction link 604 and a closure link 608 pivotally coupled the transfer link 606 and coupled to one of the doors 502, for example, in a non-pivoting manner. The closure link 608, in the example shown, is pivotally coupled an anchor link 610, which is coupled to the base 506, for example, in a non-pivoting manner.

As shown in FIGS. 6A-6C, as the coupler activation surface 510 moves from the extended position, in which the doors 502 are in the first closed position, toward the base 506, the reaction link 604 pivots the transfer link 606, thereby pivoting the closure link 608 relative to the anchor link 610, such that the door 502 coupled to the closure link 608 moves from the first closed position closing an associated opening 512 (see FIGS. 6A and 6B), through an arc A to the second open position, for example, as shown in FIG. 6C. This example movement may be concurrently (e.g., substantially simultaneously) performed by other linkages 602 of the housing 114, such that other doors 502 may move from the first closed position to the second open position. As the coupler activation surface 510 and/or the barrier 514 move from the compressed position back to the extended position, the linkage 602 moves in a manner opposite the manner shown in FIGS. 6A-6C. Other linkage configurations and/or movements are contemplated.

FIG. 7 is a perspective view of an example charging box 106, an example charge coupler 108, and an underside 700 of an example vehicle 102. FIGS. 8 and 9 respectively show the example charging box 106 and the example charge coupler 108. In FIGS. 7 and 9, for clarity and the purpose of explanation, the housing 114 of the charge coupler 108 has been omitted. As shown in FIG. 7, the example charging box 106 is configured to be received in a recess 702 in the underside 700 of the chassis 302 of the vehicle 102. As shown, the example charging box 106 may be coupled to the chassis 302 (e.g., in the recess 702), and the charging box 106 may include the interface electrical contacts 112, which may be in electrical communication with one or more batteries carried by the vehicle 102, for example, as explained herein. For example, the charging box 106 may include two outputs 704, each at opposite ends of the charging box 106, and in some examples, each of the outputs 704 may be electrically coupled to a battery carried by the vehicle 102. In some examples, the outputs 704 may take the form of electrical connectors, and the charging box 106 and/or the electrical connectors may be configured to be adjusted relative to a longitudinal axis of the charging box 106, for example, to accommodate coupling slightly misaligned or offset cables providing electrical communication between the charging box 106 and the one or more batteries. For example, the electrical connectors may be configured to move about 5 millimeters in the Y and/or Z directions, although other distances and/or directions of adjustments are contemplated.

The charging box 106 may also include an interface activation surface 706. In some examples, for example as shown, the interface electrical contacts 112 may be substantially flush with the interface activation surface 706. In some examples, the interface electrical contacts 112 may be recessed relative to the interface activation surface 706, and in some examples, the interface electrical contacts 112 may be flush or protrude relative to the interface activation surface 706. In some examples, the coupler activation surface 510 of the charge coupler 108 may be configured to be contacted by the interface activation surface 706 of the charging box 106. For example, as the interface activation surface 706 contacts the coupler activation surface 510 and moves the coupler activation surface 510 from the extended position toward the base 506 of the charge coupler 108 (and/or toward a support surface 308) to the compressed position, one or more of the doors 502 of the housing 114 of the charge coupler 108 may move from the first closed position to the second open position, for example, as described with respect to FIGS. 5A-5E and/or 6A-6C.

As shown in FIGS. 7 and 9, the example charge coupler 108 may be configured to be coupled to an electrical power source and facilitate transfer of electrical power from the electrical power source to the interface electrical contacts 112 of the charging box 106 when the interface electrical contacts 112 of the charging box 106 are brought into contact with the coupler electrical contacts 116 of the charge coupler 108. In some examples, the electrical power source may be any source of electrical power sufficient to supply electric power for charging batteries of an electrically powered vehicle, such as, for example, an electric vehicle charging station. As shown, the charge coupler 108 may include a power cable 120 coupled to an electrical connector 122 coupled to the charge coupler 108 and configured to be coupled to the electrical power source to facilitate transfer of electrical power from the electrical power source to the charge coupler 108. In some examples, the power cable 120 may include one or more of a positive cable, a negative cable, and a ground cable. In some examples, the electrical connector 122 may be configured to transmit one or more of data or electrical power between the charge coupler 108 and the electrical power source, for example, via a standard electrical connection (e.g., a standard electrical connection and/or according to a standard protocol, such as, for example, SAE J1772-CCS1, CHAdeMO, IEC-type 2, or the like).

FIGS. 10A, 10B, 10C, and 10D show views of example alignment, offset, and misalignment between example interface electrical contacts 112 and example coupler electrical contacts 116, for example, during a charging event while the interface electrical contacts 112 and coupler electrical contacts 116 are in electrical communication with one another transferring electrical power from the coupler electrical contacts 116 to the interface electrical contacts 112. For example, the coupler electrical contacts 116 of the charge coupler 108 may present substantially planar coupler contact surfaces, and the interface electrical contacts 112 of the charging box 108 may present substantially planar interface contact surfaces configured to provide an electrical coupling between the interface electrical contacts 112 of the charging box 106 and the coupler electrical contacts 116 of the charge coupler 108. In some examples, each of the interface contact surfaces define an interface surface area, and each of the coupler contact surfaces define a coupler surface area, and the interface surface area may be greater than the coupler surface area, for example, as shown in FIGS. 10A-10D. Such an example configuration may result in an effective electrical contact being achieved between the coupler electrical contacts 116 of the charge coupler 108 and the interface electrical contacts 112 of the charging box 106, even when the coupler electrical contacts 116 and the interface electrical contacts 112 are not substantially aligned with one another and/or are offset with respect to one another.

For example, the interface electrical contacts 112 may define an interface contact axis X, and the coupler electrical contracts 116 may define a coupler contact axis Y. As shown in FIG. 10A, the interface contact axis X and the coupler contact axis Y are substantially aligned with one another and the interface electrical contacts 112 and the coupler electrical contacts 116 are not offset with respect to one another. FIGS. 10B and 10C show examples of the interface electrical contacts 112 and the coupler electrical contacts 116 being longitudinally and laterally offset with respect to one another, respectively. FIG. 10D shows an example of the interface contact axis X and the coupler contact axis Y being misaligned with one another. (FIG. 10D shows only the coupler electrical contacts 116 of the charge coupler 108.) The examples shown in FIGS. 10B-10D still provide electrical communication between the interface electrical contacts 112 and the coupler electrical contacts 116. This may provide a level of tolerance in positioning the charging box 106 relative to the charge coupler 108, so that an effective electrical connection may be obtained without exact alignment and/or with a lateral and/or longitudinal offset. In some examples, the coupler contact surfaces and/or the interface contact surfaces may have a substantially rectangular shape (e.g., a substantially square shape), for example, as shown in FIGS. 10A-10D.

FIG. 11 is a flow diagram of an example process illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types.

The order in which the operations are described is not intended to be construed as a limitation, and any number of the described blocks can be combined in any order and/or in parallel to implement the process.

FIG. 11 is a flow diagram of an example process 1100 for autonomously charging one or more batteries carried by an autonomous vehicle including one or more electrical propulsion units. At 1102, the example process 1100 may include maneuvering the autonomous vehicle over a charge coupler including one or more coupler electrical contacts coupled to an electrical power source. For example, the charge coupler may include a housing enclosing the one or more coupler electrical contacts of the charge coupler and a coupler activation surface configured to face an underside of the autonomous vehicle. In some examples, the autonomous vehicle may maneuver over the charge coupler according to any of the methods described herein.

At 1104, the example process 1100 may also include lowering an interface activation surface associated with the autonomous vehicle relative to a support surface on which the autonomous vehicle is supported, such that the interface activation surface contacts the coupler activation surface of the charge coupler. For example, the autonomous vehicle may include a charging box including one or more interface electrical contacts electrically coupled to the one or more batteries and an interface activation surface facing the support surface on which the autonomous vehicle is supported, and the process 1100 may include, at 1104, lowering the interface activation surface relative to the support surface.

The process 1100, at 1106, in some examples, may further include continuing to lower the interface activation surface and exposing the one or more electrical contacts of the charge coupler. For example, the process 1100, at 1106, may include continuing to lower the interface activation surface, such that the interface activation surface causes the coupler activation surface to move toward the support surface and expose the one or more coupler electrical contacts of the charge coupler to the underside of the autonomous vehicle.

The process 1100, at 1108, in some examples, may further include continuing to lower the interface activation surface, such that the one or more interface electrical contacts of the charging box contact the one or more coupler electrical contacts of the charge coupler.

At 1110, the process 1100 may also include electrically coupling the one or more batteries of the autonomous vehicle to the electrical power source. For example, the one or more batteries of the autonomous vehicle may be electrically coupled to the electrical power source via the one or more coupler electrical contacts of the charge coupler and the one or more interface electrical contacts of the charging box, for example, as described herein.

The process 1100, at 1112, may further include determining whether the charging process is complete. For example, a charge controller may determine whether the level of charge of the one or more batteries has increased to a level desired (e.g., a complete charge), for example, as described previously herein.

If at 1112 it has been determined that the charging is complete, at 1114, the process 1100 may include raising the interface activation surface of the charging box, for example, relative to the support surface. In some examples, this may result in the coupler activation surface of the charge coupler moving away from a compressed position toward an extended position, and separation of the interface electrical contacts from the coupler electrical contacts. In some examples, as the coupler activation surface reaches the extended position, doors coupled to the charge coupler may move from a second open position to a first closed position, thereby enclosing the coupler electrical contacts within a housing of the charge coupler.

At 1116, the process 1100 may also include maneuvering the autonomous vehicle away from the charge coupler, for example, according to methods described herein.

If at 1112, it is determined that the charging is not complete, at 1118, the process 1100 may include continuing to charge to the one or more batteries of the autonomous vehicle. Following additional charging, the process 1100 may include returning to 1112 to determine whether the charging is complete.

The systems, components, and methods described herein may be implemented using any combination of software or hardware elements. The systems, components, and methods described herein may be implemented using one or more virtual machines operating alone or in combination with one other. Any applicable virtualization solution may be used for encapsulating a physical computing machine platform into a virtual machine that is executed under the control of virtualization software running on a hardware computing platform or host. The virtual machine may have both virtual system hardware and guest operating system software.

The systems and methods described herein may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication, such as a communication network. Examples of communication networks include, for example, a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

It should be appreciated that the subject matter presented herein may be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations may be performed in combination with other types of program components. Generally, program components include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances, and the like.

Based on the foregoing, it should be appreciated that technologies for operating the systems and implementing the processes have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A. An example charge coupler comprising:
an electrical connector configured to be coupled to an electrical power source;
an electrical contact; and
a housing for enclosing the electrical contact, the housing comprising:
a base configured to support the electrical contact;
an activation surface opposite the base, the activation surface having an opening;
a door configured to move between a first position in which the door covers the opening and a second position in which the door is open and exposes the electrical contact;
and
a linkage coupling the activation surface to the door, such that as the activation surface moves from an extended position toward a compressed position, the door moves from the first position to the second position.

B. The charge coupler of example A, wherein the linkage is coupled to the base, the activation surface, and the door.

C. The charge coupler of example A or example B, further comprising a biasing member coupled to the activation surface and the base and configured to bias the activation surface toward the extended position.

D. The charge coupler of any one of example A through example C, wherein applying at least a portion of a weight of a vehicle to the activation surface causes the activation surface to move to the compressed position.

E. The charge coupler of any one of example A through example D, wherein the electrical contact is at least partially supported by a contact biasing member configured to bias the electrical contact in a direction away from the base.

F. The charge coupler of any one of example A through example E, wherein when the activation surface is in the compressed position, the electrical contact extends through the opening, such that an end of the electrical contact remote from the base extends beyond a plane in which the opening lies.

G. The charge coupler of any one of example A through example F, wherein the housing further comprises a peripheral portion coupling the base and the activation surface to one another, and wherein the peripheral portion comprises a resilient flexible material at least one of (1) forming a seal between the base and the activation surface throughout a range of motion from the extended position to the compressed position, or (2) biasing the activation surface toward the extended position.

H. The charge coupler of any one of example A through example G, wherein the housing further comprises a barrier opposite the base and coupled to the activation surface, the barrier defining the opening.

I. The charge coupler of any one of example A through example H, wherein the activation surface extends at least partially around a periphery of the barrier and the barrier moves with the activation surface.

J. An example system for charging a battery carried by a vehicle, the system comprising:
a charge coupler comprising:
an electrical connector configured to be coupled to an electrical power source;
an electrical contact configured to be electrically coupled to a vehicle electrical contact of the vehicle; and
a housing for enclosing the electrical contact of the charge coupler, the housing comprising:
a base configured to support the electrical contact of the charge coupler;
an activation surface opposite the base, the activation surface of the charge coupler having an opening; and
a door configured to move between a first position closing the opening and a second position opening the opening and exposing the electrical contact,
wherein the activation surface and the door are coupled to one another, such that applying force to the activation surface causes the activation surface to move from an extended position toward a compressed position, causes the door to move from the first position to the second position, causes the electrical contact to contact the vehicle electrical contact, and causes energy to flow to or from the vehicle via the electrical contact.

K. The system of example J, wherein the activation surface and the door are coupled to one another, such that applying weight to the activation surface causes the activation surface to move from an extended position toward a compressed position.

L. The system of example J or example K, wherein the charge coupler comprises at least three electrical contacts, and the at least three electrical contacts are substantially aligned with one another along a line.

M. The system of any one of example J through example L, wherein the electrical contact of the charge coupler presents a substantially planar coupler contact surface, and the vehicle electrical contact presents a substantially planar vehicle contact surface.

N. The system of any one of example J through example M, wherein a first surface area of the vehicle electrical contact is greater than a second surface area of the electrical contact.

O. An example method for charging a battery carried by a vehicle, the vehicle comprising a charging box comprising an interface electrical contact electrically coupled to the battery and an interface activation surface facing a support surface on which the vehicle is supported, the method comprising:
maneuvering the vehicle over a charge coupler comprising a coupler electrical contact coupled to an electrical power source, the charge coupler comprising a housing enclosing the coupler electrical contact of the charge coupler and a coupler activation surface configured to face an underside of the vehicle;

lowering the interface activation surface relative to the support surface, such that the interface activation surface contacts the coupler activation surface of the charge coupler;

continuing to lower the interface activation surface, such that the interface activation surface causes the coupler activation surface to move toward the support surface and expose the coupler electrical contact of the charge coupler to the underside of the vehicle, such that the interface electrical contact of the charging box contact the coupler electrical contact of the charge coupler; and electrically coupling the battery to the electrical power source via the coupler electrical contact of the charge coupler and the interface electrical contact of the charging box.

P. The method of example O, wherein lowering the interface activation surface comprises adjusting an adjustable suspension system to lower the vehicle relative to the support surface.

Q. The method of example O or example P, wherein causing the coupler activation surface to move toward the support surface causes a door coupled to the charge coupler to move from a first position closing an opening in the charge coupler to a second position opening the opening in the charge coupler, thereby exposing the coupler electrical contact of the charge coupler to the interface electrical contact of the charging box.

R. The method of any one of example O through example Q, further comprising causing the charge coupler to support at least a portion of a weight of the vehicle.

S. The method of any one of example O through example R, further comprising raising the vehicle and causing the interface activation surface to rise relative to the support surface, such that the housing closes, so that the coupler electrical contact is no longer exposed.

T. The method of any one of example O through example S, further comprising preventing the coupler electrical contact from being exposed unless a threshold portion of a weight of the vehicle is applied to the coupler activation surface.

What is claimed is:

1. A method for charging a vehicle, the vehicle comprising a charging box comprising an interface electrical contact and an interface activation surface, the method comprising:
   maneuvering the vehicle over a charge coupler comprising a coupler electrical contact, the charge coupler comprising a coupler activation surface configured to face an underside of the vehicle;
   lowering the interface activation surface relative to the charge coupler, such that the interface activation surface contacts the coupler activation surface of the charge coupler;
   continuing to lower the interface activation surface;
   exposing the coupler electrical contact of the charge coupler to the underside of the vehicle, such that the interface electrical contact of the charging box contacts the coupler electrical contact of the charge coupler; and
   electrically coupling the vehicle to an electrical power source via the coupler electrical contact and the interface electrical contact.

2. The method of claim 1, wherein lowering the interface activation surface comprises adjusting an adjustable suspension system to lower the vehicle relative to a support surface on which the vehicle is supported.

3. The method of claim 1, wherein exposing the coupler electrical contact comprises causing a door coupled to the charge coupler to move from a first position closing an opening in the charge coupler to a second position opening the opening in the charge coupler, thereby exposing the coupler electrical contact to the interface electrical contact.

4. The method of claim 3, wherein the vehicle further comprises a linkage coupling the activation surface to the door, such that as the coupler activation surface moves from an extended position toward a compressed position, the door moves from the first position to the second position.

5. The method of claim 1, further comprising raising the vehicle and causing the interface activation surface to rise relative to a support surface on which the vehicle is supported, such that a housing closes, so that the coupler electrical contact is no longer exposed.

6. The method of claim 1, further comprising preventing the coupler electrical contact from being exposed unless a threshold portion of a weight of the vehicle is applied to the coupler activation surface.

7. A method for charging a vehicle having a first charge interface facing a support surface on which the vehicle is supported, the method comprising:
   maneuvering the vehicle over a charge coupler comprising a second charge interface, the charge coupler configured to be electrically coupled with an electrical power source;
   adjusting a position of the first charge interface relative to the second charge interface, to align the first charge interface with the second charge interface;
   coupling the first charge interface with the second charge interface;
   electrically coupling the charge coupler to the electrical power source in response to coupling the first charge interface and the second charge interface; and
   charging the vehicle with energy from the electrical power source via the charge coupler.

8. The method of claim 7, further comprising:
   identifying, by a sensor array of the vehicle, physical markers, wherein maneuvering the vehicle comprises aligning the second charge interface with the first charge interface based at least in part on the identifying the physical markers.

9. The method of claim 7, wherein maneuvering the vehicle comprises aligning the second charge interface with the first charge interface based on a near-field communication signal between the first charge interface and the charge coupler.

10. The method of claim 7, wherein coupling the first charge interface with the second charge interface comprises establishing an inductive charging path.

11. The method of claim 10, further comprising:
   detecting a current, temperature, voltage, or impedance from the inductive charging path
   wherein the adjusting a position of the first charge interface is based at least in part on the detecting the current, temperature, voltage, or impedance.

12. The method of claim 7, wherein adjusting the position of the first charge interface with the second charge interface comprises lowering the first charge interface to be electrically coupled with the second charge interface.

13. The method of claim 7, further comprising:
   determining that moving the first charge interface increases a charging potential; and
   maneuvering the vehicle based at least in part on determining that moving the first charge interface increases the charging potential.

14. The method of claim 7, wherein coupling the first charge interface with the second charge interface comprises adjusting an adjustable suspension system to lower the vehicle relative to the support surface.

15. The method of claim 7, wherein adjusting the first charge interface comprises changing a position of the first charge interface along the support surface in response to determining that changing the position increases a charging potential.

16. One or more non-transitory computer-readable media having instructions stored thereon that, when executed by one or more processors, cause the one or more processors to:
- maneuver a vehicle having a first charge interface along a support surface over a charge coupler having a second charge interface;
- align, along the support surface, the first charge interface and the second charge interface;
- reposition the first charge interface or the second charge interface along a vertical axis to modify a vertical distance between the first charge interface and the second charge interface;
- electrically couple the charge coupler to an electrical power source in response to coupling the first charge interface and the second charge interface; and
- charge a battery of the vehicle using the electrical power source via the charge coupler.

17. The one or more non-transitory computer-readable media of claim 16, wherein the instructions to maneuver the vehicle comprise further instructions to align the second charge interface with the first charge interface based on a near-field communication signal between the first charge interface and the charge coupler.

18. The one or more non-transitory computer-readable media of claim 16, wherein the instructions to maneuver the vehicle comprise further instructions to align the second charge interface with the first charge interface by identifying physical markers using a sensor array of the vehicle.

19. The one or more non-transitory computer-readable media of claim 16, wherein the instructions to maneuver the vehicle comprise further instructions to change a position of the first charge interface along the support surface in response to determining that changing the position increases a charging potential.

20. The one or more non-transitory computer-readable media of claim 16, wherein the instructions to reposition the first charge interface or the second charge interface comprises further instructions to lower the first charge interface to contact the second charge interface.

* * * * *